United States Patent
Kaml et al.

(10) Patent No.: US 12,140,812 B2
(45) Date of Patent: Nov. 12, 2024

(54) FIBER OPTIC FANOUT WITH INTERMEDIATE PORTIONS AND METHOD OF ASSEMBLY

(71) Applicant: COMMSCOPE TECHNOLOGIES LLC, Hickory, NC (US)

(72) Inventors: Jonathan R. Kaml, Shakopee, MN (US); Kenneth Allen Skluzacek, Belle Plaine, MN (US)

(73) Assignee: CommScope Technologies LLC, Hickory, NC (US)

( * ) Notice: Subject to any disclaimer, the term of this patent is extended or adjusted under 35 U.S.C. 154(b) by 322 days.

(21) Appl. No.: 17/604,105

(22) PCT Filed: Apr. 16, 2020

(86) PCT No.: PCT/US2020/028522
§ 371 (c)(1),
(2) Date: Oct. 15, 2021

(87) PCT Pub. No.: WO2020/214813
PCT Pub. Date: Oct. 22, 2020

(65) Prior Publication Data
US 2022/0252817 A1 Aug. 11, 2022

Related U.S. Application Data

(60) Provisional application No. 62/835,303, filed on Apr. 17, 2019.

(51) Int. Cl.
*G02B 6/44* (2006.01)
(52) U.S. Cl.
CPC ......... *G02B 6/4472* (2013.01); *G02B 6/4476* (2013.01)

(58) Field of Classification Search
CPC .......................... G02B 6/4472; G02B 6/44715
See application file for complete search history.

(56) References Cited

U.S. PATENT DOCUMENTS

| | | | | |
|---|---|---|---|---|
| 4,625,073 A | * | 11/1986 | Breesch | H02G 15/013 |
| | | | | 174/74 A |
| 5,048,918 A | | 9/1991 | Daems et al. | |

(Continued)

FOREIGN PATENT DOCUMENTS

| | | |
|---|---|---|
| TW | 200925691 A | 6/2009 |
| WO | 2012/168292 A2 | 12/2012 |

OTHER PUBLICATIONS

English Translation of First Chinese Office Action for Application No. 202080028995.6, mailed Feb. 24, 2023 (10 pages).

(Continued)

*Primary Examiner* — Chris H Chu
(74) *Attorney, Agent, or Firm* — Merchant & Gould P.C.

(57) ABSTRACT

A main fanout includes a plurality of intermediate fanout devices that are connected to one another. Each intermediate fanout device can be assembled separately and then connected together to form the main fanout. Each intermediate fanout device is connected to an intermediate cable of a main cable and a plurality of optical fibers of each intermediate cable is positioned within at least one furcation tube. The plurality of optical fibers and at least one furcation tube are secured to a main body of each intermediate fanout device. Each intermediate fanout device includes a mating feature to connect to adjacent intermediate fanout devices with a like mating feature. The mating feature reduces relative movement between adjacent intermediate fanout devices.

14 Claims, 22 Drawing Sheets

(56) References Cited

U.S. PATENT DOCUMENTS

| | | | |
|---|---|---|---|
| 5,649,042 A * | 7/1997 | Saito | G02B 6/443 |
| | | | 385/102 |
| 7,035,511 B1 | 4/2006 | Rhoney et al. | |
| 9,435,975 B2 | 9/2016 | Ott et al. | |
| 2005/0254755 A1 * | 11/2005 | Sun | G02B 6/4476 |
| | | | 385/115 |
| 2012/0134629 A1 | 5/2012 | Lu et al. | |
| 2014/0037255 A1 * | 2/2014 | Mullaney | G02B 6/4471 |
| | | | 385/100 |
| 2014/0233903 A1 | 8/2014 | Valderrabano et al. | |
| 2015/0260936 A1 | 9/2015 | Newbury et al. | |
| 2016/0209615 A1 | 7/2016 | Bakatsias et al. | |
| 2021/0382243 A1 * | 12/2021 | Kanai | G02B 6/3885 |

OTHER PUBLICATIONS

English Translation of Second Chinese Office Action for Application No. 202080028995.6, mailed Jul. 5, 2023 (4 pages).
First Indian Examination Report for Application No. 202117043614, mailed Sep. 6, 2023 (10 pages).
Extended European Search Report for Application No. 20790868.2 mailed Nov. 29, 2022.
International Search Report and Written Opinion of the International Searching Authority for International Patent Application No. PCT/US2020/028522 mailed Aug. 7, 2020, 15 pages.

* cited by examiner

FIBER OPTIC FANOUT WITH INTERMEDIATE PORTIONS AND METHOD OF ASSEMBLY

CROSS-REFERENCE TO RELATED APPLICATION

This application is a National Stage Application of PCT/US2020/028522, filed on Apr. 16, 2020, which claims the benefit of U.S. Patent Application Ser. No. 62/835,303, filed on Apr. 17, 2019, the disclosures of which is are incorporated herein by reference in their entireties. To the extent appropriate, a claim of priority is made to each of the above disclosed applications.

BACKGROUND

In general, a cable fanout is a component at which optical fibers of a cable are separated into two or more groups of one or more fibers. In certain types of applications, a fanout is mounted near, or on, a mounting apparatus (i.e., on a rack) and the optical fibers are broken out at the fanout and are upjacketed (e.g., using furcation tubes) to protect the fibers before the fibers enter equipment, such as a telecommunications chassis. Improvements are required.

SUMMARY

Some aspects of the disclosure are directed to various types of cable fanout arrangements/devices and methods of assembly thereof. In certain examples, optical fibers are separated into multiple groups of optical fibers within a single component. For example, the fanout device includes intermediate fanout devices that can be simultaneously assembled and then connected to one another to form the organized fanout device.

In one aspect of the present disclosure, an optical fiber cable is disclosed. The optical fiber cable includes a main cable outer jacket that has a first end and a second end. The main cable outer jacket has a slit that extends from the first end of the main cable outer jacket to a termination location on the main cable outer jacket. The optical fiber cable includes a slit cover positioned over the main cable outer jacket. The slit cover extends at least from the termination location to the first end of the main cable outer jacket to cover the slit. The optical fiber cable includes a plurality of intermediate cables positioned within the main cable outer jacket. Each of the plurality of intermediate cables contains a plurality of optical fibers within an intermediate cable outer jacket. The optical fiber cable includes a main fanout. The main fanout includes a plurality of intermediate fanout devices that are connected to one another. Each intermediate fanout device is connected to an intermediate cable of the plurality of intermediate cables. The plurality of optical fibers of each intermediate cable is positioned within at least one furcation tube. The plurality of optical fibers and at least one furcation tube is secured to a main body of each intermediate fanout device. Each intermediate fanout device includes a mating feature to connect to adjacent intermediate fanout devices with a like mating feature. The mating feature reduces relative movement between adjacent intermediate fanout devices.

In another aspect of the present disclosure, a method of forming a fanout arrangement of telecommunications cable is disclosed. The method includes providing a main cable having a main cable outer jacket having a first end and a second end. The main cable includes a plurality of intermediate cables within the main cable outer jacket. Each of the plurality of intermediate cables has an intermediate cable outer jacket. Each of the plurality of intermediate cables contains a plurality of optical fibers within the intermediate cable outer jacket. The method includes separating the main cable outer jacket along a slit to expose the intermediate cables. The slit extends from the first end of the main cable outer jacket to a termination location. The method includes positioning each of the plurality of intermediate cables at at least one of a plurality of work stations. The method at each work station includes positioning a furcation tube around at least one of the optical fibers of the plurality of optical fibers. The method at each work station includes securing the plurality of optical fibers and furcation tubes within a main body of an intermediate fanout device, the furcation tubes extending away from the main body. The method includes connecting each of the intermediate fanout devices from each work station to one another using an integral mating feature of each intermediate fanout device. The mating features of the intermediate fanout devices reduce relative movement between adjacent intermediate fanout devices. The method includes forming a main fanout from the plurality of intermediate fanout devices.

In another aspect of the present disclosure, a telecommunication system is disclosed. The telecommunication system includes a main cable outer jacket that has a first end and a second end. The telecommunication system includes a plurality of intermediate cables positioned within the main cable outer jacket, each of the plurality of intermediate cables contains a plurality of optical fibers within an intermediate cable outer jacket. The telecommunication system includes a chassis that receives the plurality of intermediate cables. The telecommunication system includes a fanout positioned at least partially within the chassis. The fanout is connected to at least one of the plurality intermediate. The plurality of optical fibers of each intermediate cables is positioned within a plurality of furcation tubes. The telecommunication system includes a cable guide positioned within chassis. The cable guide defines at least one cable channel. At least one of the plurality of furcation tubes is positioned, and movable, within the at least one cable channel. The at least one cable channel has an open position, where access to the at least one cable channel is allowed, and a closed position, where access to the at least one cable channel is restricted.

A variety of additional aspects will be set forth in the description that follows. The aspects can relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
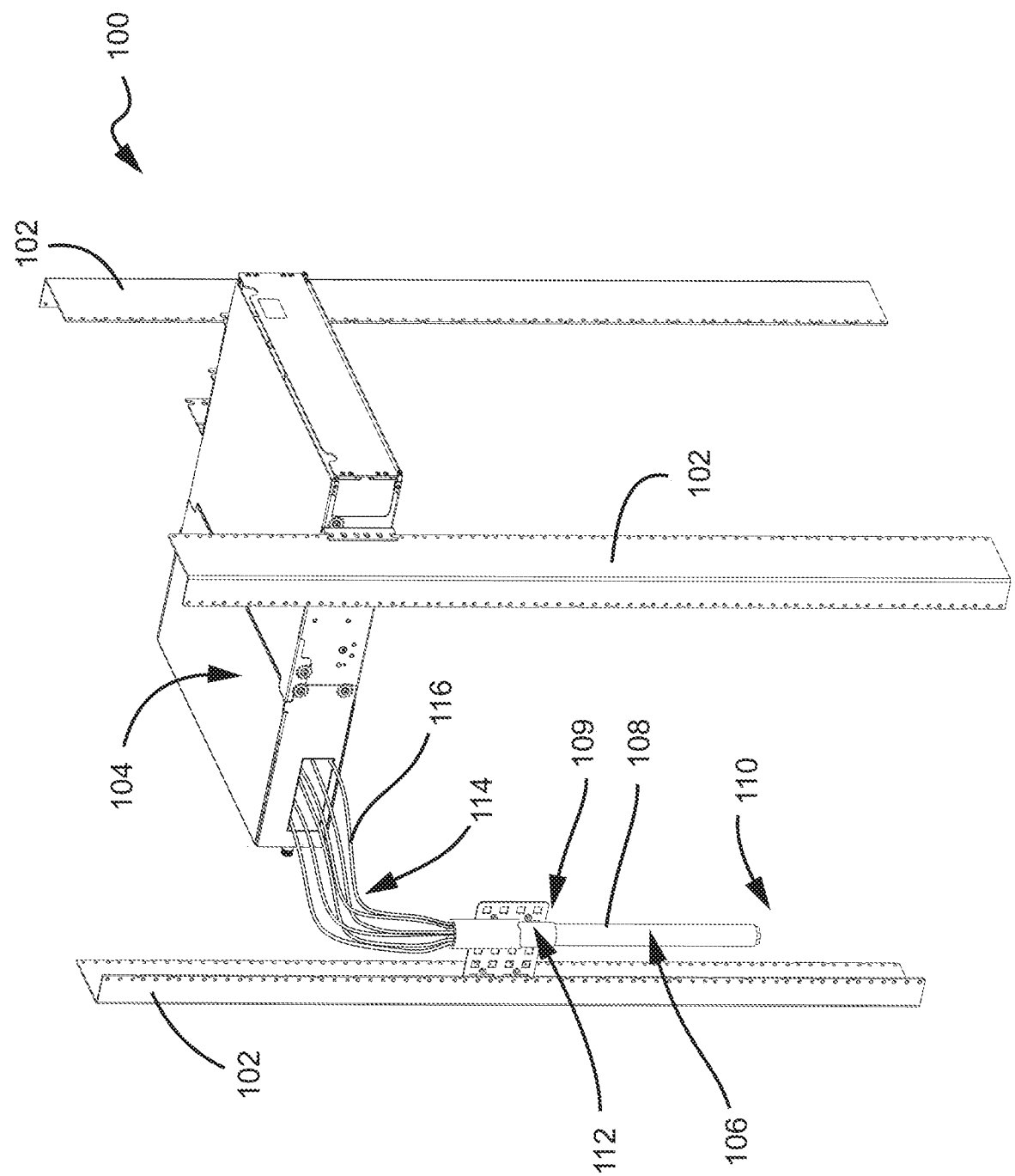
FIG. 1 is a perspective view of a telecommunications environment, according to one example of the present disclosure.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

The present disclosure is directed to a cable fanout. In use, the fanout can be used in a data center or other location. The main fanout can be positioned within a chassis or outside of a chassis, such as on a mounting structure (i.e., a rack). The main fanout can include a plurality of intermediate fanouts that can be assembled simultaneously and then connected to one another to form the main fanout. This arrangement reduces the amount of time required to assemble the main fanout, thus increasing manufacturing throughput. Further, a robust compact main fanout is created.

FIG. 1 illustrates an example telecommunications environment 100. As shown, the environment 100 includes a plurality of mounting structures 102 and a chassis 104 mounted to the mounting structures 102. A main cable 106 (also known as a trunk cable) includes an outer jacket 108 that is disposed at the exterior of the main cable 106 from a first end 109 to a second end 110. In some examples, the outer jacket 108 has a robust, stiff construction to provide sufficient protection to the main cable 106 and its internal components. The second end 110 is shown schematically and can extend away from the mounting structures 102. The main cable 106 includes a main fanout 112 mounted to the mounting structures 102. An array 114 of furcation tubes 116 extends away from the main fanout 112 and into the chassis 104.

Figure 2:
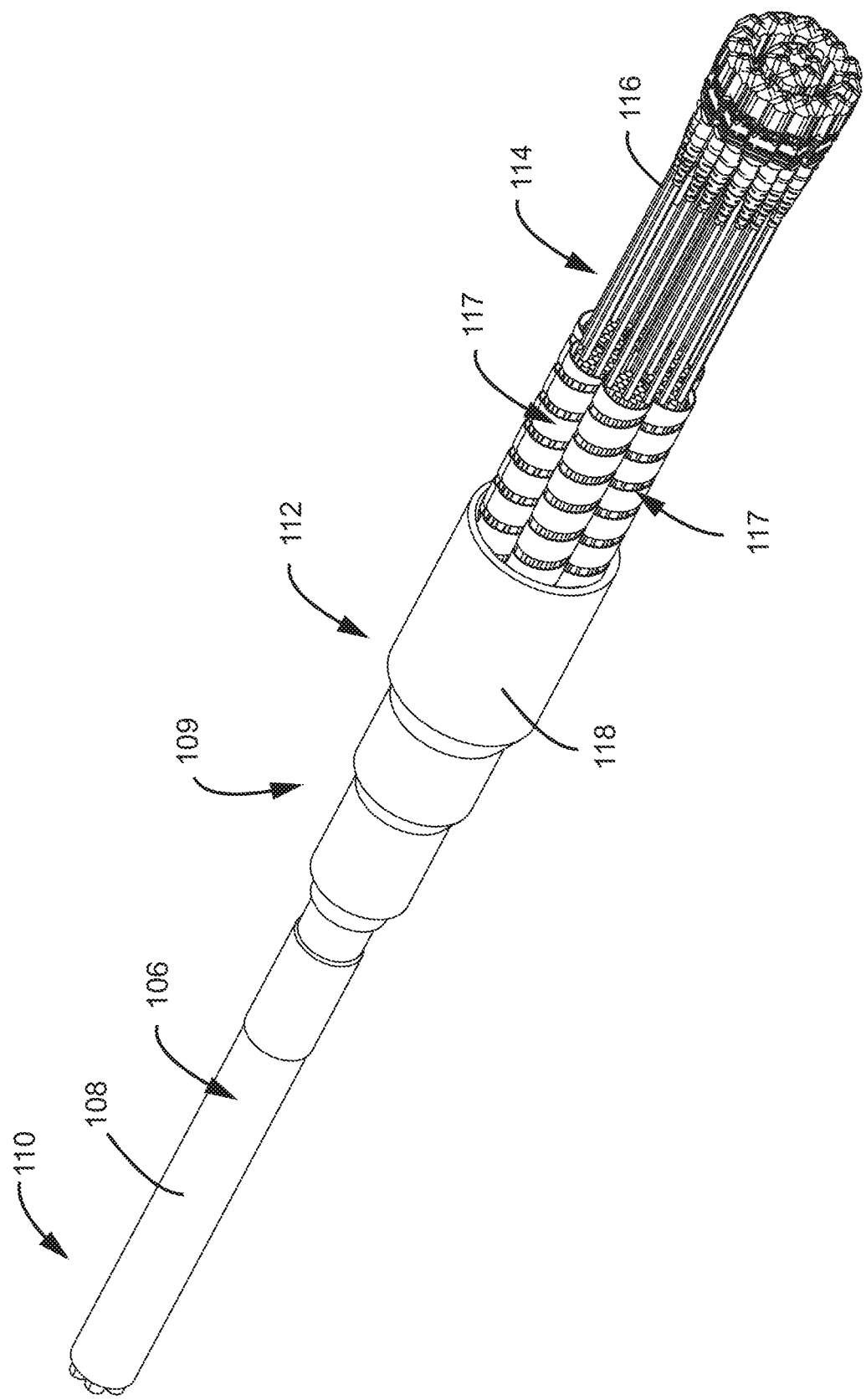
FIG. 2 is a perspective view of a cable with a main fanout, according to one example of the present disclosure.

FIG. 2 shows a perspective view of the main cable 106, the main fanout 112, and the array 114 of furcation tubes 116. In the depicted example, a shrinkable tube 118 is disposed around the main fanout 112 (e.g., a thermally responsive tube, an elastic tube, etc.). In some examples, the shrinkable tube 118 also is also disposed around portions of the main cable 106 and the array 114 of furcation tubes 116. In some examples, the furcation tubes 116 can be organized in bundles 117. In some examples, the shrinkable tube 118 is heat shrink. In some examples, the shrinkable tube 118 is cold shrink.

Figure 3:
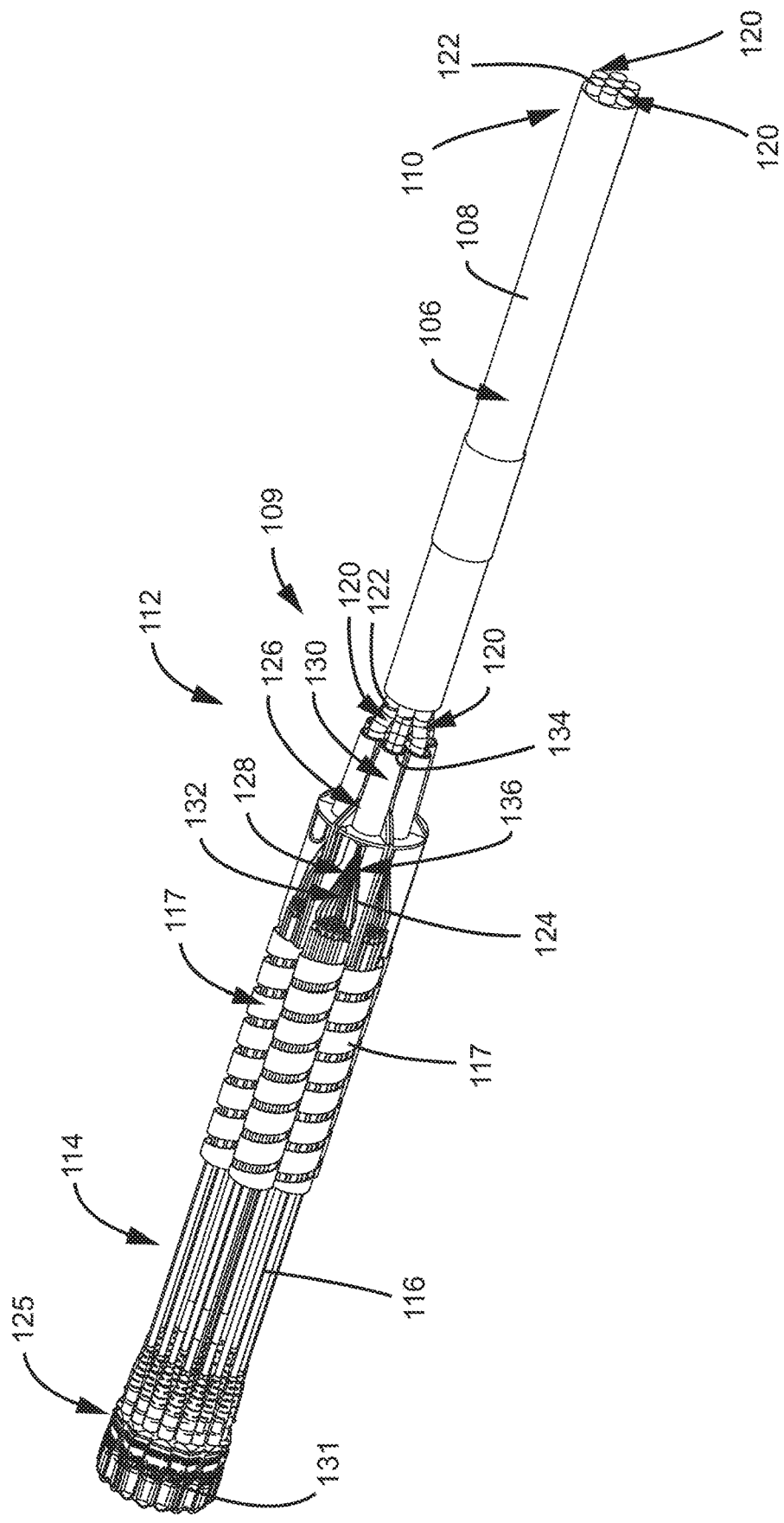
FIG. 3 is another perspective view of the cable and main fanout of FIG. 2.

FIG. 3 shows a perspective view of the main cable 106, the main fanout 112, and the array 114 of furcation tubes 116 with the shrinkable tube 118 removed.

The main cable 106 includes a plurality of intermediate cables 120 disposed within the outer jacket 108. In some examples, the outer jacket 108 is separable to partially expose the plurality of intermediate cables 120. Each intermediate cable 120 includes an intermediate cable outer jacket 122. Contained within the intermediate cable outer jacket 122 are a plurality of optical fibers 124. In certain examples, the optical fibers 124 are disposed within a central tube, arranged in a plurality of ribbons, or are loose within the intermediate cables 120. In certain implementations, the main cable 106 and/or the intermediate cable 120 includes at least one strength member. (e.g., aramid yarn, GRP rods, etc.). Each intermediate cable 120 travels to the main fanout 112 where the plurality of optical fibers 124 are separated from each intermediate cable 120 and positioned within the furcation tubes 116. The furcation tubes 116 include at least one optical fiber 124. In some examples, each furcation tube 116 can contain more than one optical fiber 124.

The array 114 of furcation tubes 116 projects from the main fanout 112. The furcation tubes 116 protect the optical fibers 124 as they exit the main fanout 112. The lengths of the furcation tubes 116 are variable and may be different than shown, with respect to a particular use. In some examples, at least portions of the furcation tubes 116 are flexible (e.g., they can include a polymeric tubing), so a technician can direct them to selected functions. The array 114 can include any suitable configuration of furcation tubes 116. Each of the furcation tubes 116 can be adapted to an individual fiber or a plurality of fibers, such as in the case of ribbon cables. In the example shown, furcation tubes are organized in bundles 117 that are substantially cylindrical, and the array 114 is also cylindrical, each of which can support a single optical fiber 124 from a main cable 106 for protecting the individual fiber. Thus, the main fanout 112 serves to route the plurality of individual fibers 124 from a main cable 106 into individual furcation tubes 116. In some examples, the number of furcation tubes 116 is selected to correspond to the number of optical fibers 124 being routed from a main cable 106. The array 114 can be other shapes, such as rectangular, oblong, square, and so forth. Similarly, as noted above, the overall shape of the main fanout 112 can be any of a variety of suitable shapes (e.g., round, oblong, square).

Like the main cable 106 and intermediate cables 120, the furcation tubes 116 can each include at least one strength member. In some examples, at a terminating end 125 outside of the main fanout, the furcation tubes 116 terminate at a connector 131. In some examples, the connectors 131 are in the form of LC, SC (single fiber), and/or MPO (multiple fibers) connectors. In some examples, the connectorized furcation tubes 116 can be plugged into corresponding connectors/adapters and/or stored for future use.

The main fanout 112 includes a plurality of intermediate fanout devices 126 that are each connectable to one another to form the main fanout 112. In some examples, the intermediate fanout devices 126 are identical to one another. In some examples, the intermediate fanout devices 126 differ in construction with one another. In the depicted examples, the intermediate fanout devices 126 are generally wedge-shaped and connect to one another to form the main fanout 112. In some examples, the main fanout 112 has a generally cylindrical shape and includes a generally circular transverse cross-section. However, it is considered within the scope of the present disclosure that the main fanout 112 can have a variety of different shapes. Each intermediate fanout device 126 includes a main body 128 that has a first end 130 and a second end 132.

The first end 130 of the main body 128 of the intermediate fanout device 126 is configured to receive the intermediate cable 120 within an opening 134. The opening 134 at least partially surrounds the intermediate cable 120, specifically the intermediate cable outer jacket 122.

The second end 132 of the main body 128 of the intermediate fanout device 126 includes a channel 136 for positioning, and securing therein, the plurality of optical fibers 124 and at least one furcation tube 116. In some examples, the channel 136 is v-shaped. In some examples, the second end 132 can also include an organizer that is configured to hold and organize the plurality of furcation tubes 116.

Figure 4:
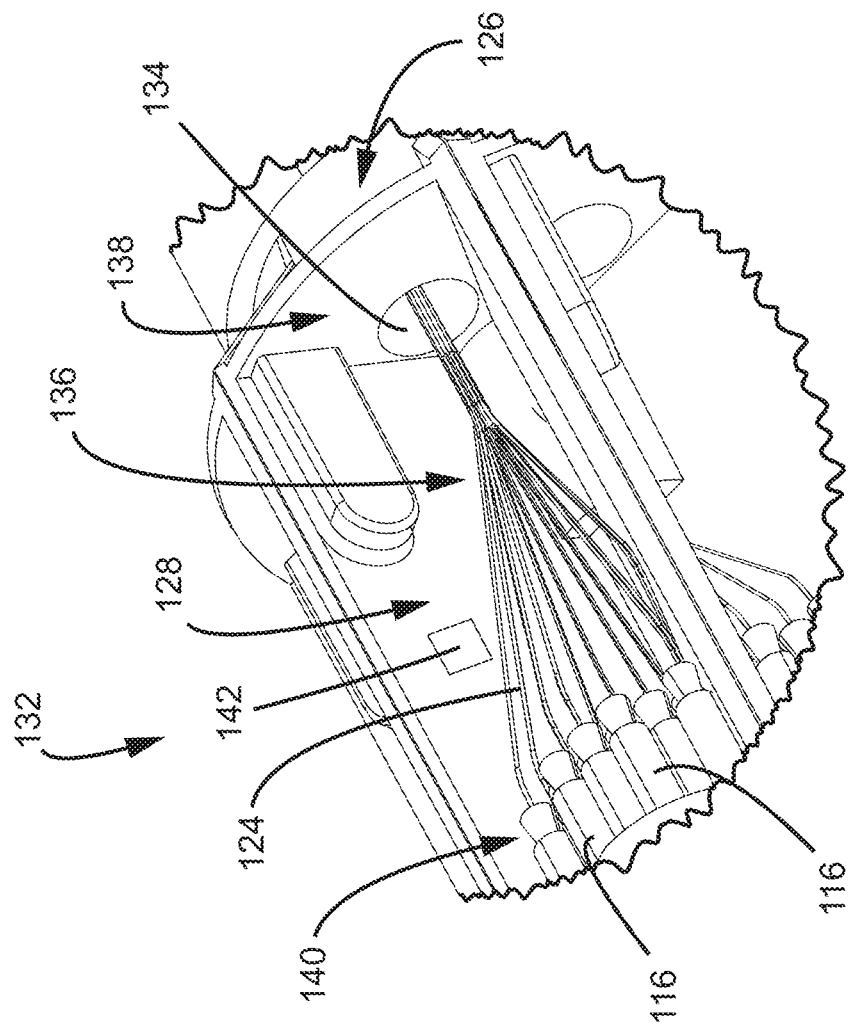
FIG. 4 is a zoomed-in portion of the cable and main fanout of FIG. 2.

FIG. 4 shows a zoomed-in perspective view of the second end 132 of the main body 128 of one of the intermediate fanout devices 126. As shown, the optical fibers 124 enter the channel 136 at a first channel end 138 and leave a second channel end 140 positioned within a furcation tube 116. The channel 136 can be an open channel. In some examples, an adhesive 142 (shown schematically) is deposited within the channel 136 to seal substantially the whole channel 136 once the optical fibers 124 and furcation tubes 116 are positioned therein. The adhesive 142 fixes the optical fibers and furcation tubes 116 within the channel 136 to reduce the likelihood of the plurality of optical fibers 124 and furcation tubes 116 from being pulled out of the channel 136, and therefore the intermediate fanout device 126. In some examples, the adhesive 142 can be an epoxy that hardens.

Figure 5:
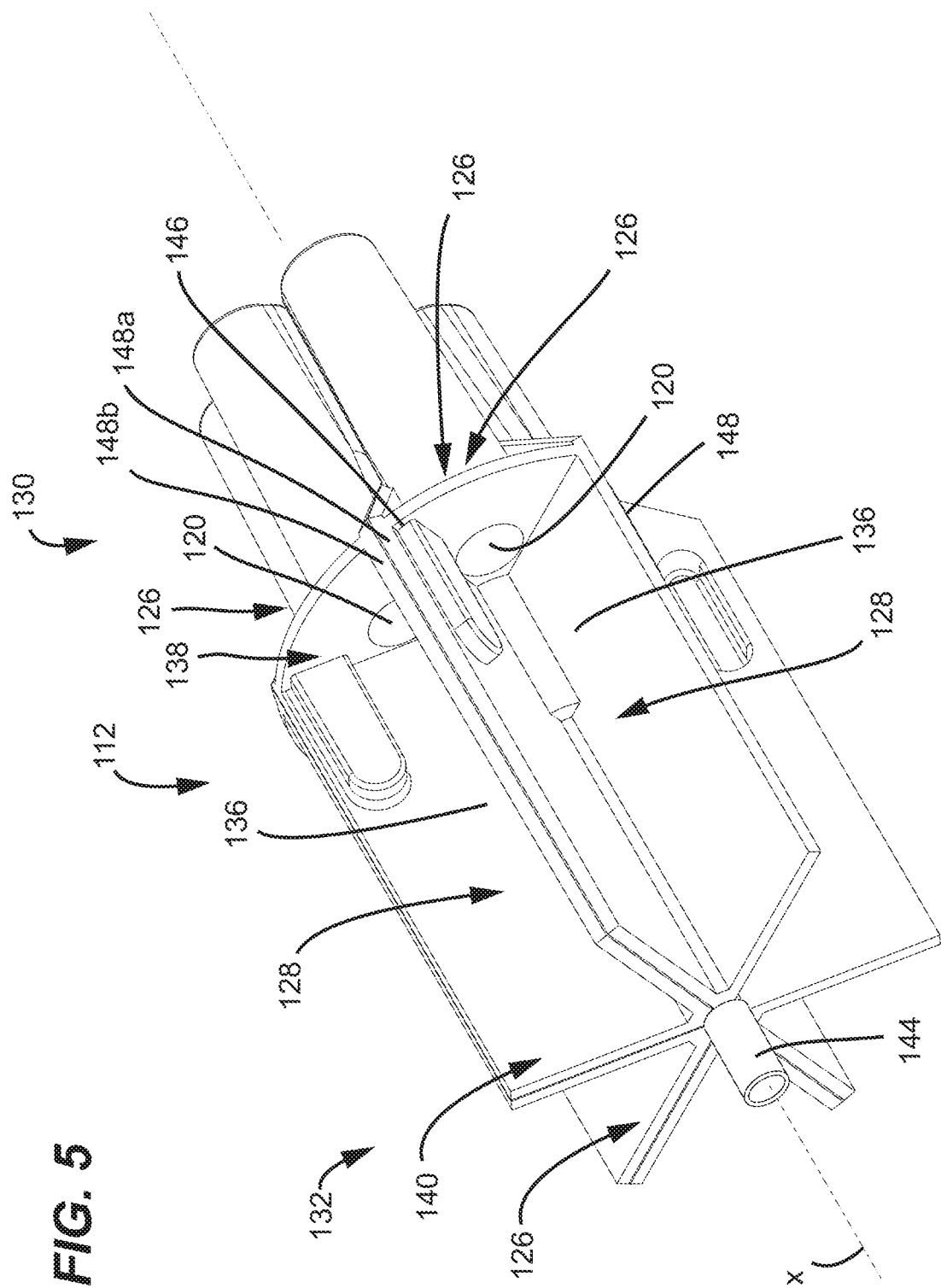
FIG. 5 is a perspective view of the main fanout of FIG. 2.
Figure 6:
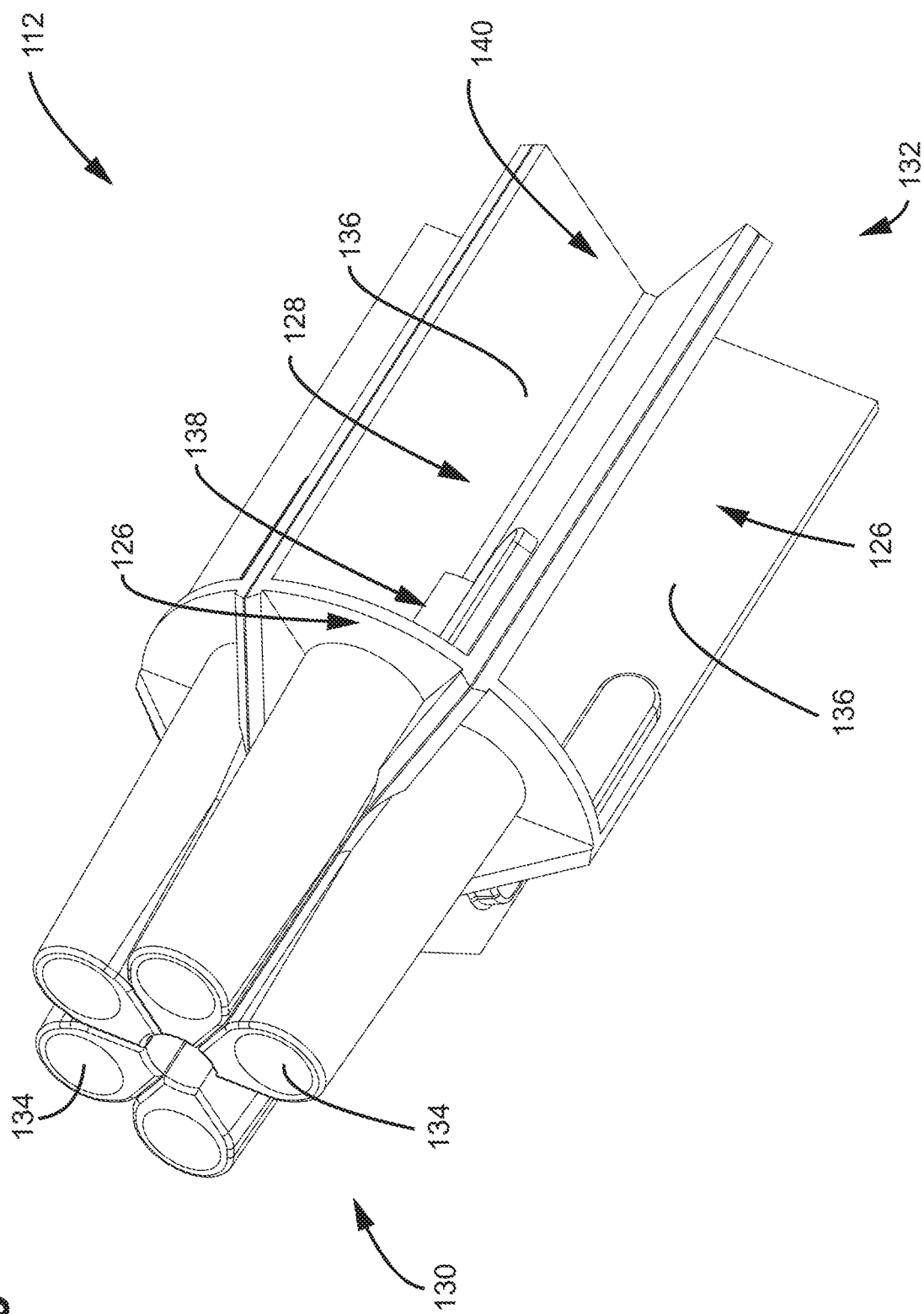
FIG. 6 is another perspective view of the main fanout of FIG. 2.
Figure 8:
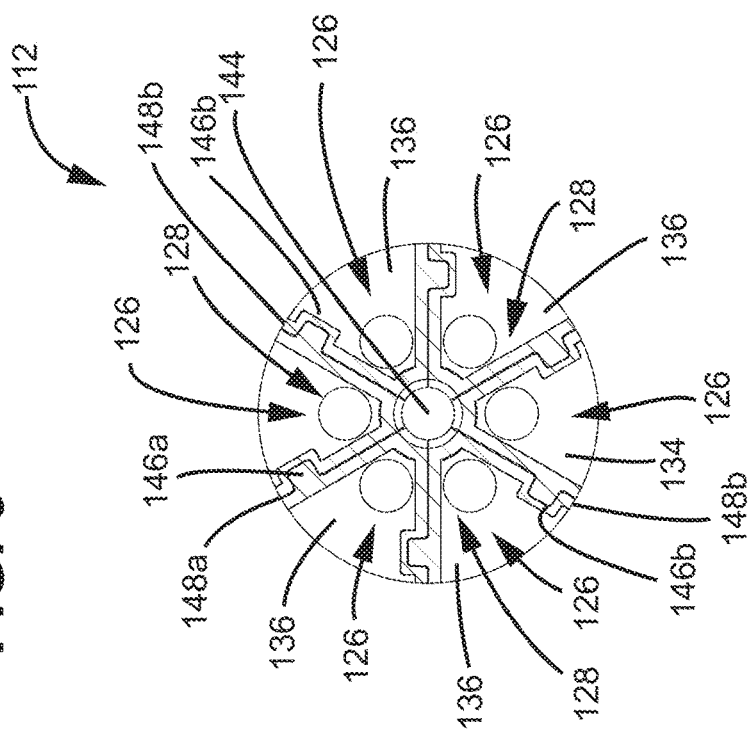
FIG. 8 is cross-sectional view of the main fanout of FIG. 2 along line 8-8.
Figure 7:
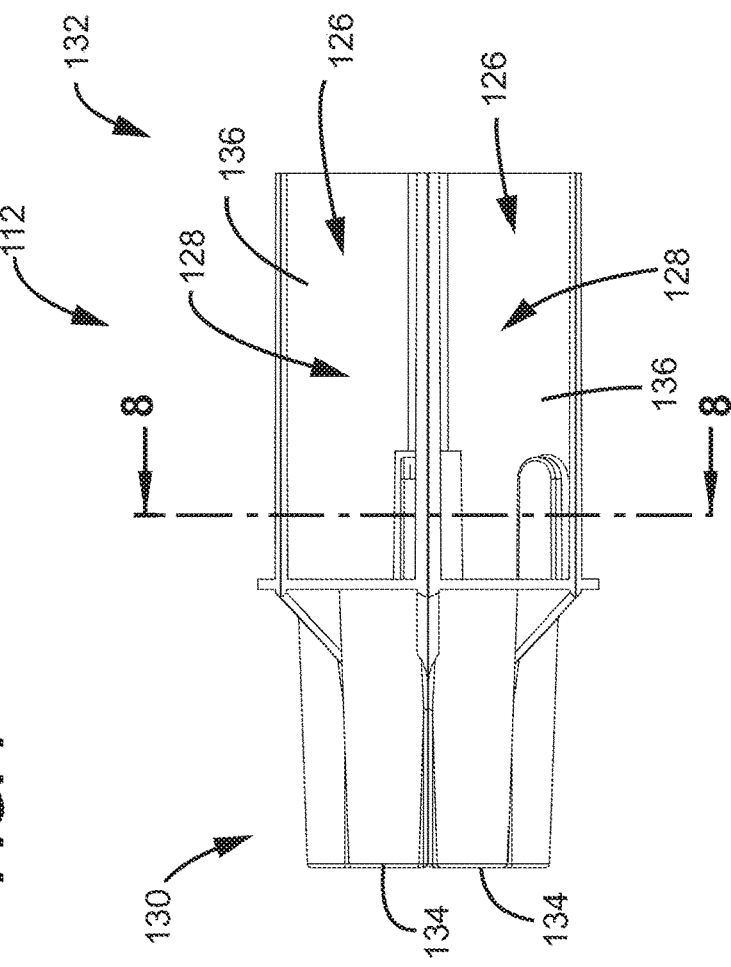
FIG. 7 is side view of the main fanout of FIG. 2.

FIGS. 5 and 6 are perspective views the main fanout 112 including the plurality of the intermediate fanout devices 126. FIG. 7 shows a side view of the main fanout 112, and FIG. 8 shows a cross-sectional view along line 8-8 in FIG. 7. The main fanout 112 extends along a length defining a longitudinal axis X.

In some examples, the intermediate fanout devices 126 are positioned around a strength member 144. In some examples, the strength member 144 can be a rod.

Each intermediate fanout device 126 includes at least one mating feature 146 to connect to, and limit relative rotation between, adjacent intermediate fanout devices 126. In some examples, the least one mating feature 146 is a snap to hold the intermediate fanout device 126 to the adjacent intermediate fanout device 126.

As depicted, each intermediate fanout device 126 incudes a pair of mating features 146*a*, 146*b* disposed on opposite exterior walls 148*a*, 148*b* of the channel 136. As shown, the mating features 146 are a projection and a recess. The mating feature 146*a* mates with mating feature 146*b* of adjacent intermediate fanout devices 126. In some examples, the main fanout 112 includes six intermediate fanout devices 126 that are configured to mate with one another.

Figure 9:
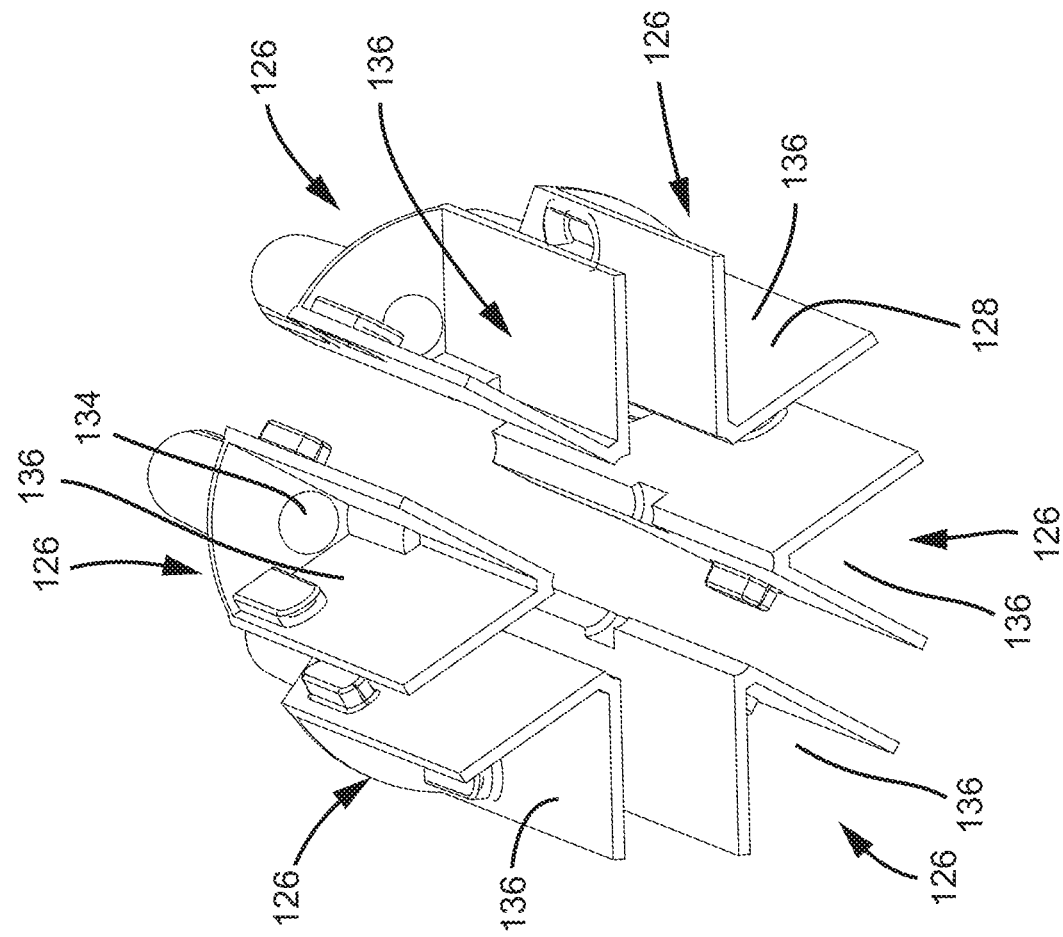
FIG. 9 is a perspective exploded view of the main fanout of FIG. 2.
Figure 10:
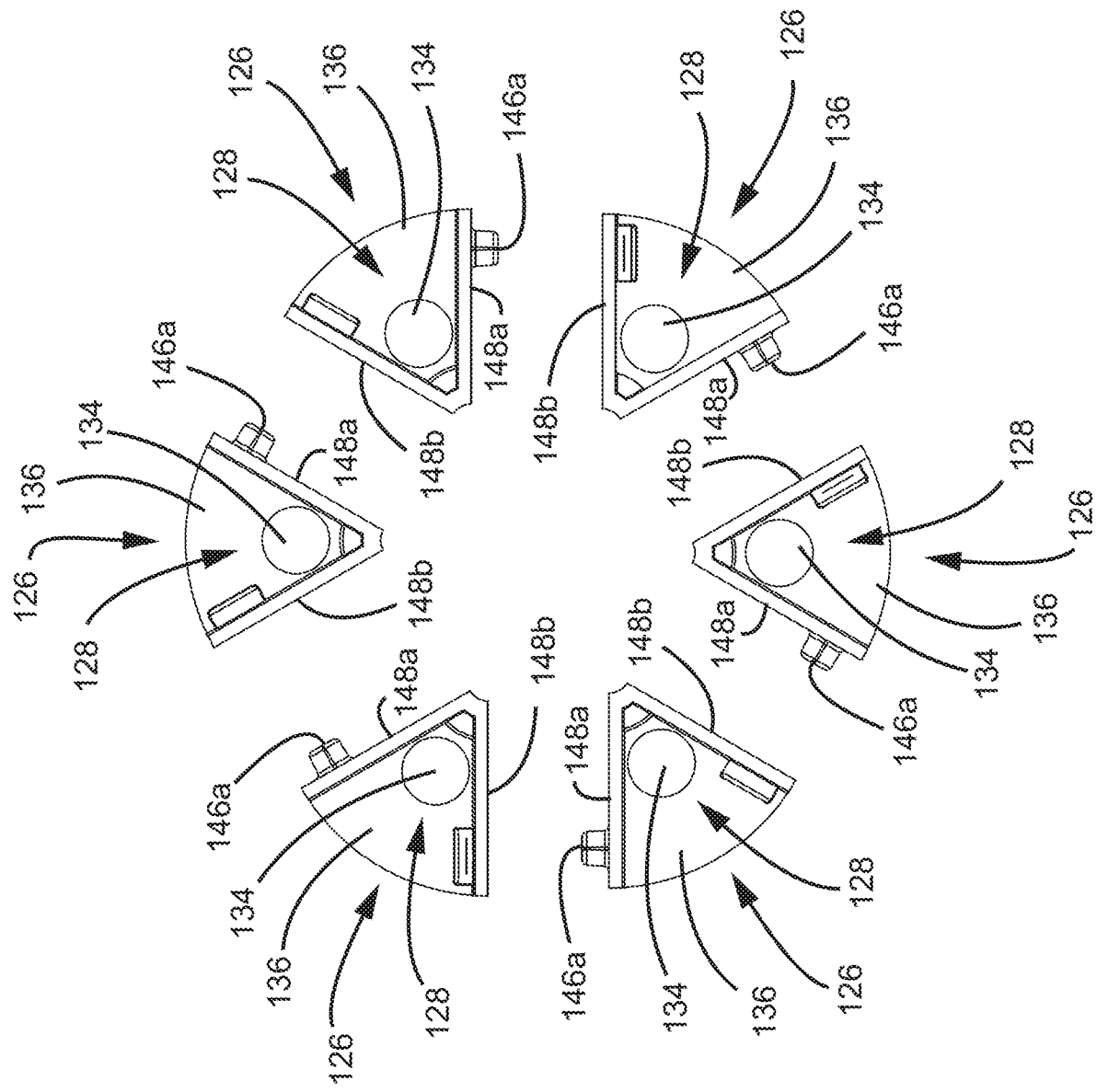
FIG. 10 is an end exploded view of the main fanout of FIG. 2.
Figure 11:
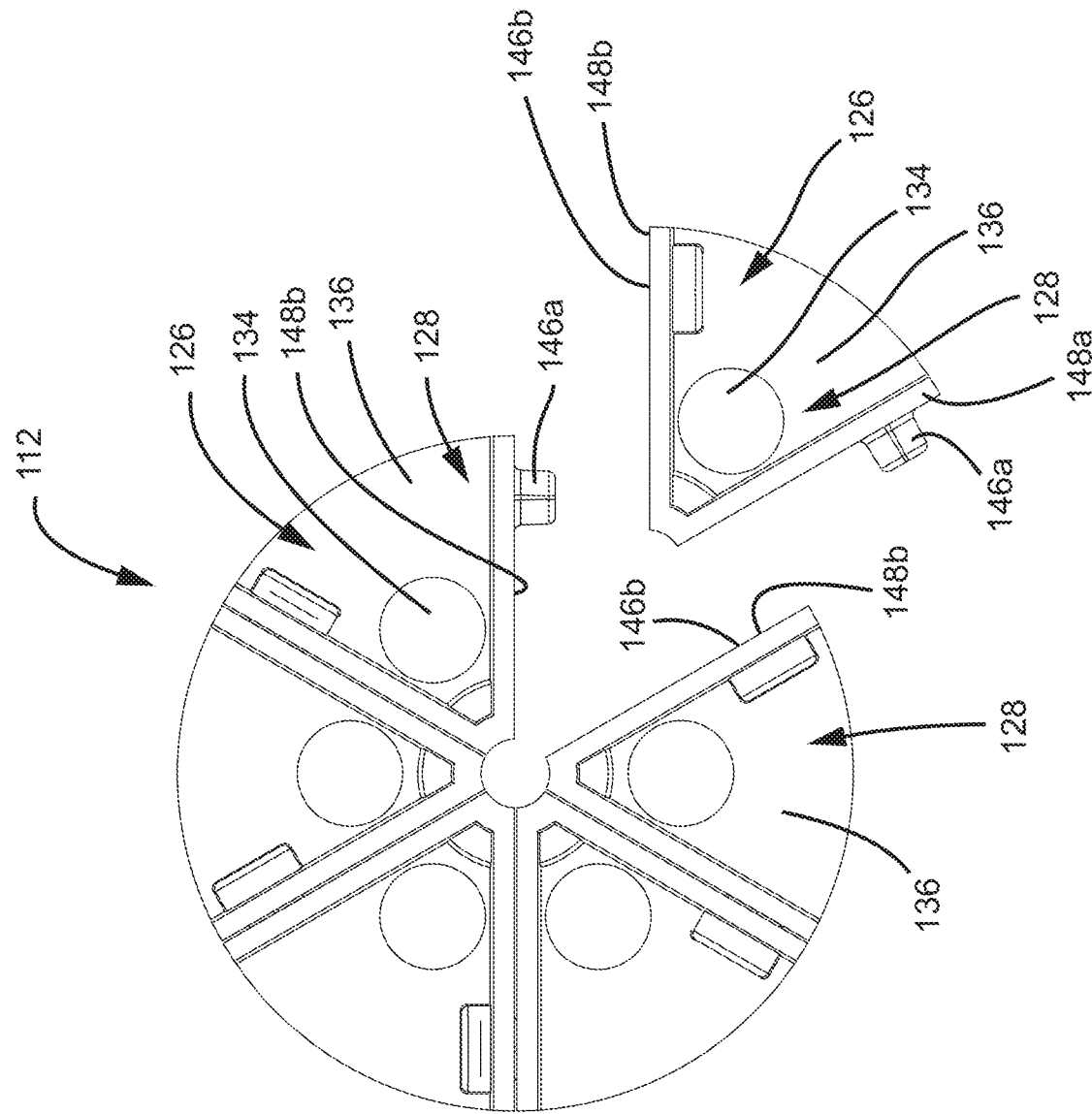
FIG. 11 is an end, partially exploded view of the main fanout of FIG. 2.

FIGS. 9-11 show the main fanout 112 partially exploded. Each intermediate fanout device 126 is separable from the main fanout 112 to allow each intermediate fanout device 126 to be assembled separately from the other. This will be described in more detail herein.

Figure 12:
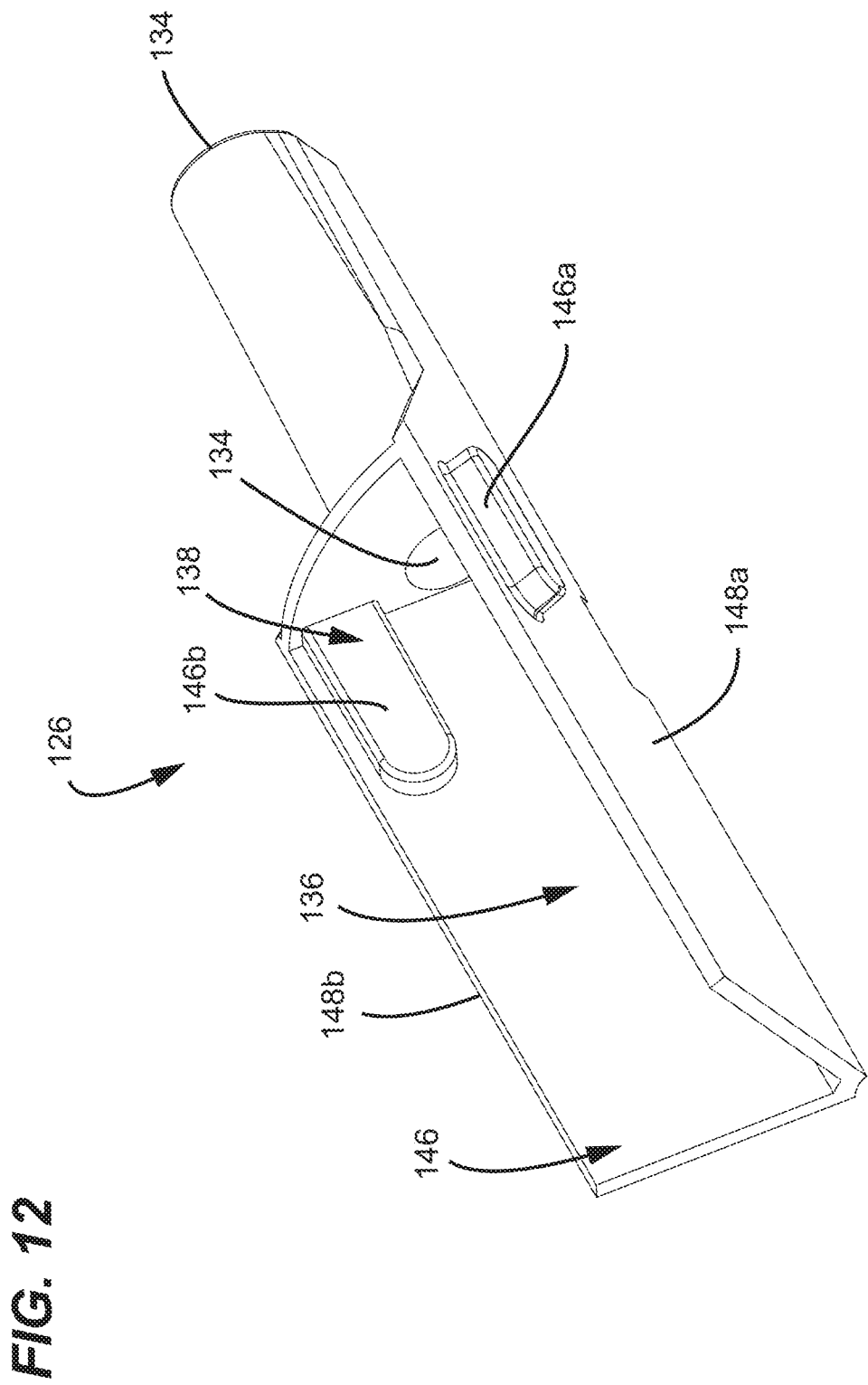
FIG. 12 is a perspective view of an intermediate fanout device of the main fanout of FIG. 2.
Figure 13:
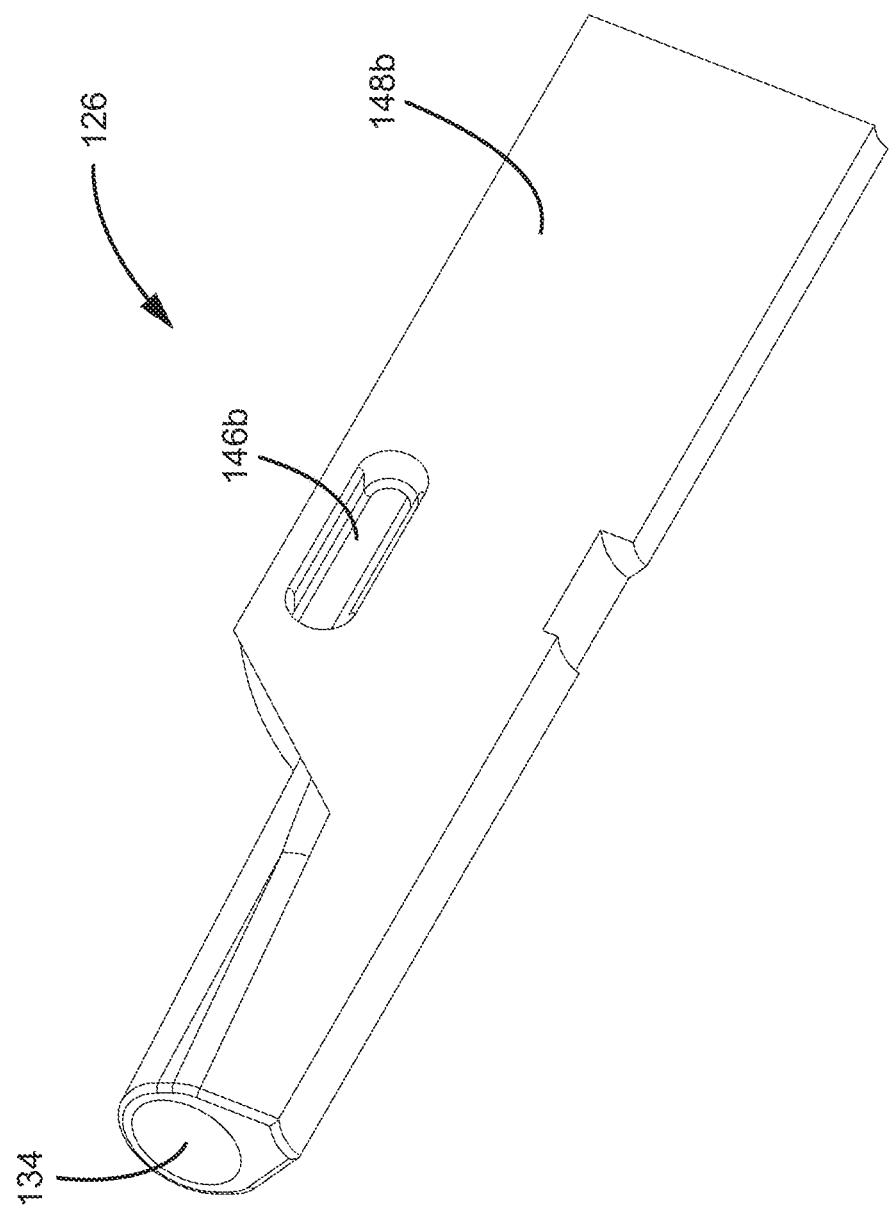
FIG. 13 is another perspective view of the intermediate fanout device of the main fanout of FIG. 2.

FIGS. 12-13 show a single intermediate fanout device 126. While the intermediate fanout device 126 is shown to have a wedge shape, it is considered within the scope of the present disclosure that the intermediate fanout device 126 can have a variety of different shapes depending on the final shape of the main fanout 112 and/or a specific application. Therefore, in some examples, the channel 136 can have a variety of shapes. In some examples, the channel 136 has a v-shaped transverse cross-section. In some examples, the channel 136 has a v-shaped longitudinal cross-section. In some examples, the channel 136 can be tapered (e.g., a funnel-like shape) as it extends from the first channel end 138 to the second channel end 140. In some examples, the channel 136 can be generally rectangular.

Figure 14:
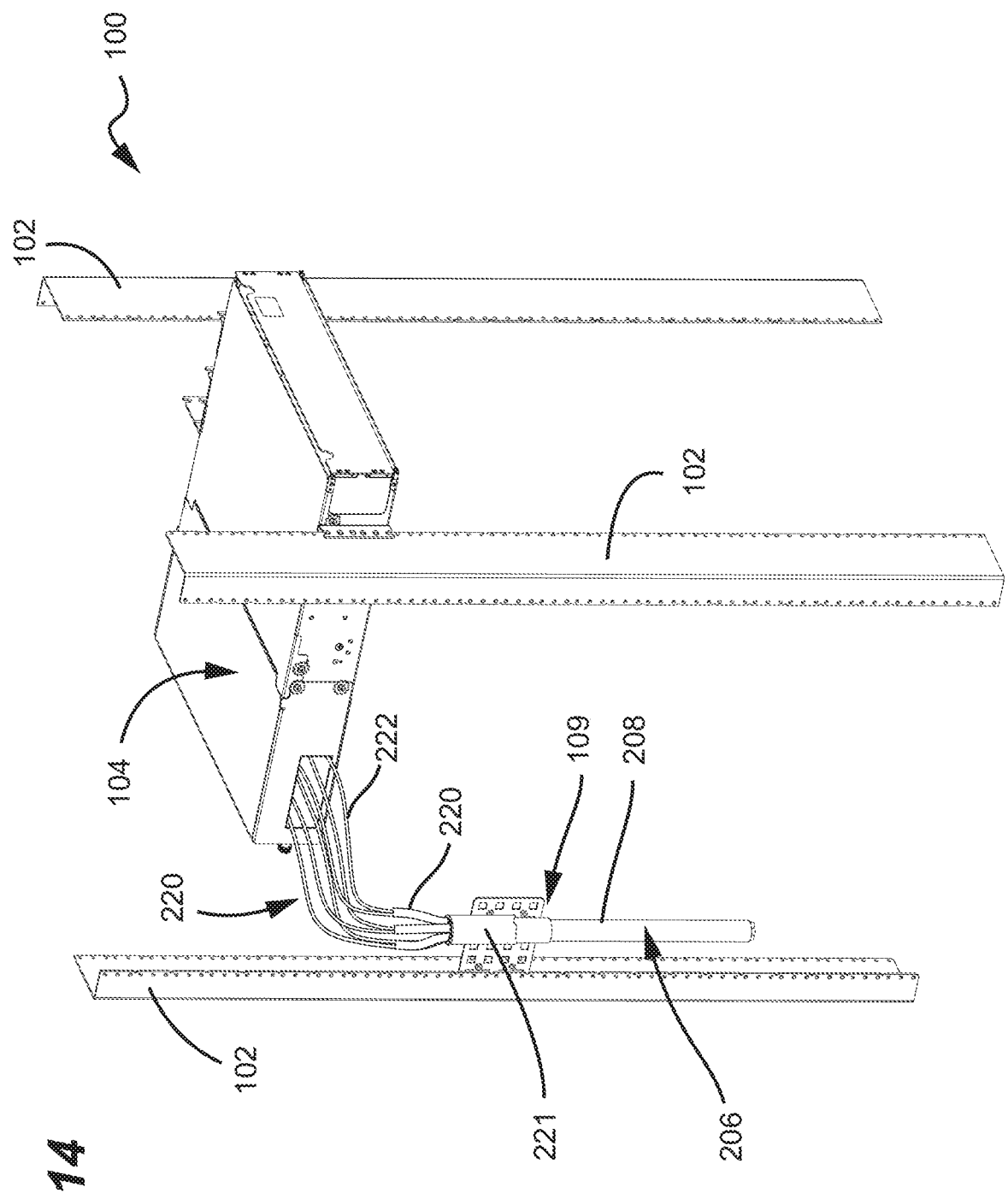
FIG. 14 is a perspective view of a telecommunications environment, according to one example of the present disclosure.

FIG. 14 shows the example telecommunications environment 100. A main cable 206 has a main cable outer jacket 208 and is shown mounted to the mounting structures 102. The main cable 206 includes one or more intermediate cables 220 therein, each including a plurality of optical fibers. The main cable 206 is substantially similar to the main cable 106, described above.

The intermediate cables 220 are shown extending from de-jacketed main cable 206 into the chassis 104. In some examples, the intermediate cable 220 can be at least partially contained with a wrap or other like organizing mechanism. Each intermediate cable 220 also includes an intermediate cable outer jacket 222. In some examples, where the main cable outer jacket 208 is removed from the main cable 206, a shrinkable tube 221 (e.g., a thermally responsive tube, an elastic tube, etc.) can be secured around the main cable 206 and the intermediate cables 220.

Figure 15:
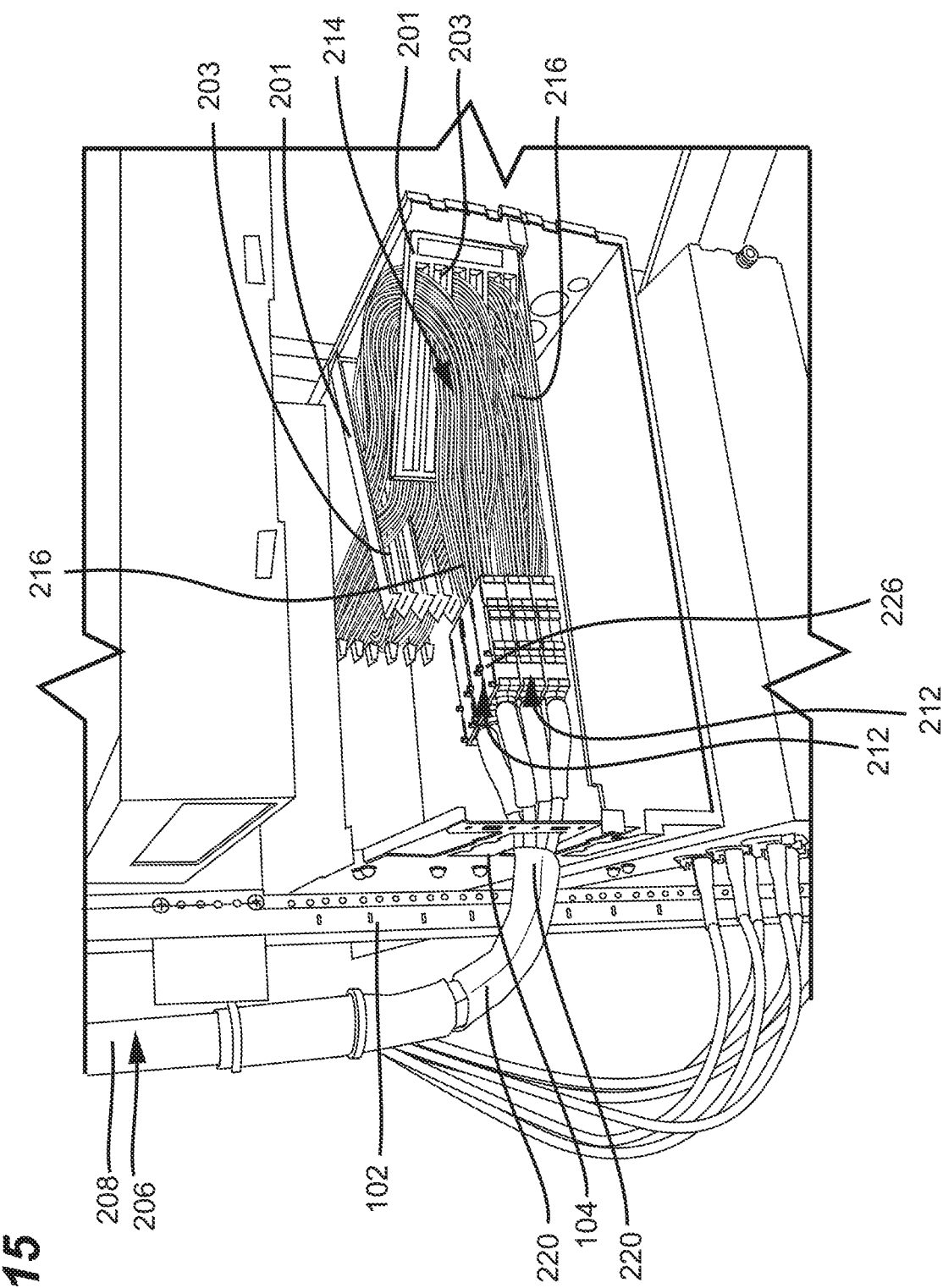
FIG. 15 is another perspective view of a telecommunications environment of FIG. 14.

FIG. 15 shows a perspective view of a main fanout 212 positioned within the chassis 104. Each intermediate cable 220 travels to the main fanout 212 positioned inside the chassis 104. The main fanout 212 includes a plurality of intermediate fanout devices 226 that connect to one another to form the main fanout 212, substantially similar to the main fanout 112 and intermediate fanout devices 126, described above. Also like the main fanout 112 above, the intermediate cables 220 terminate at the main fanout 212 and an array 214 of furcation tubes 216 extends away from the main fanout 212 and further into the chassis 104. The furcation tubes 216 are substantially similar to the furcation tubes 216, described above.

A pair of cable guides 201 are shown positioned within the chassis 104. The cable guides 201 include at least one cable channel 203 apiece in which furcation tubes 216 can be routed. In some examples, the cable guides 201 are freely moveable within the chassis 104. The furcation tubes 216 within each cable channel 130 move and slide within their respective cable channel 203 as telecommunications components 116 are moved with respect to the chassis 104. Each cable channel 130 has an open position, where access to the at least one cable channel is allowed, and a closed position, where access to the at least one cable channel is restricted. In some examples, the cable guides 201 can have different configurations. In some examples, the cable guides 201 are substantially similar. As depicted, the cable guides 201 are positioned at angles with respect to walls of the chassis 104. Depending on the application, the angles that the cable guides 201 are positioned with respect to the walls can change. The cable guides 201 are freestanding and movable within the chassis 104 and aid in organizing the furcation tubes 216. The cable guides 128 help to reduce opportunity for the furcation tubes 216 to become tangled with the other furcation tubes 216 within the chassis 104. In some examples, only a single cable guide 201 is utilized. In some examples, more than two cable guides 201 are utilized. If desired, the cable guide 201 can be fixed permanently or temporarily.

Figure 16:
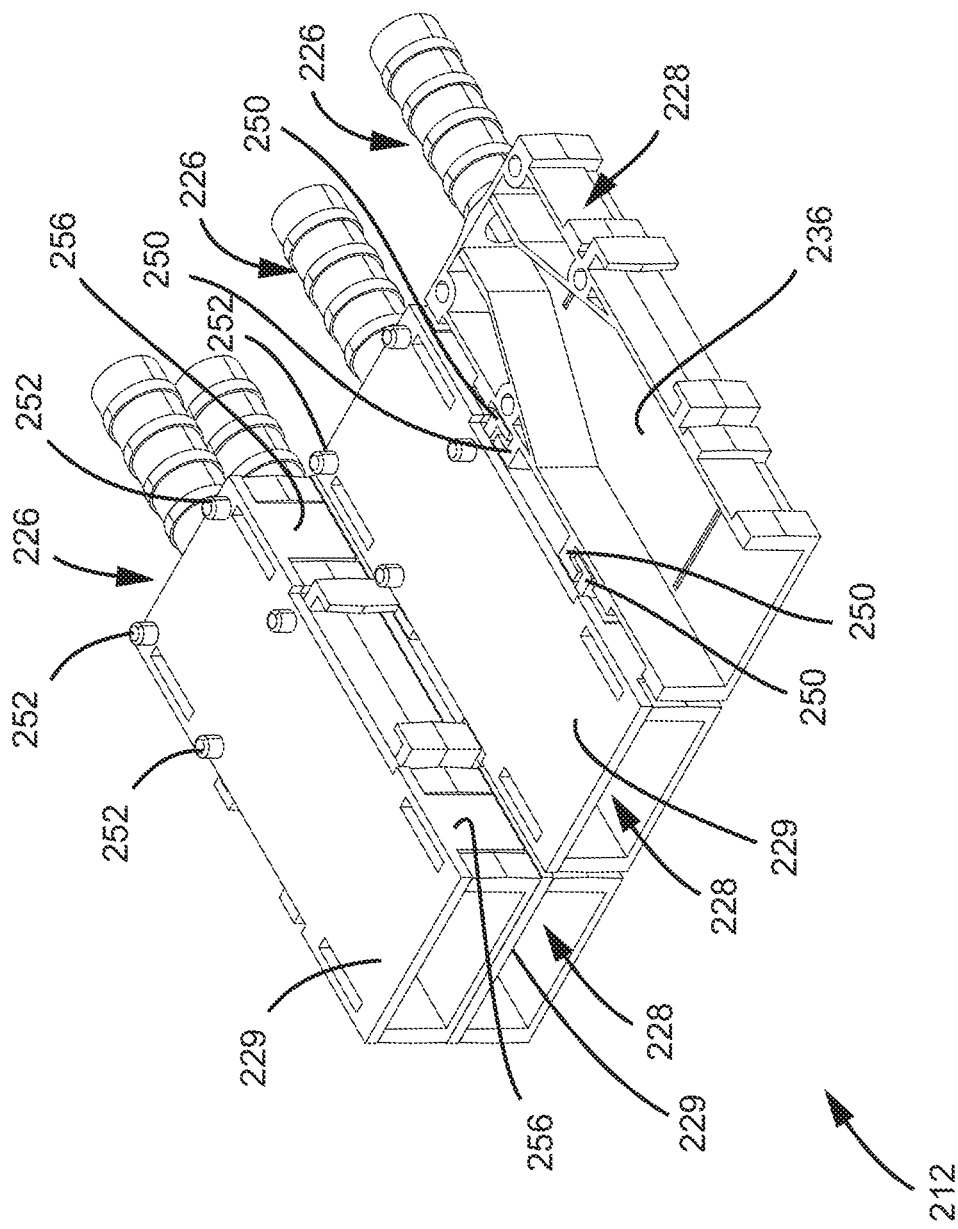
FIG. 16 is a perspective view of a portion of the main fanout of FIG. 15.
Figure 17:
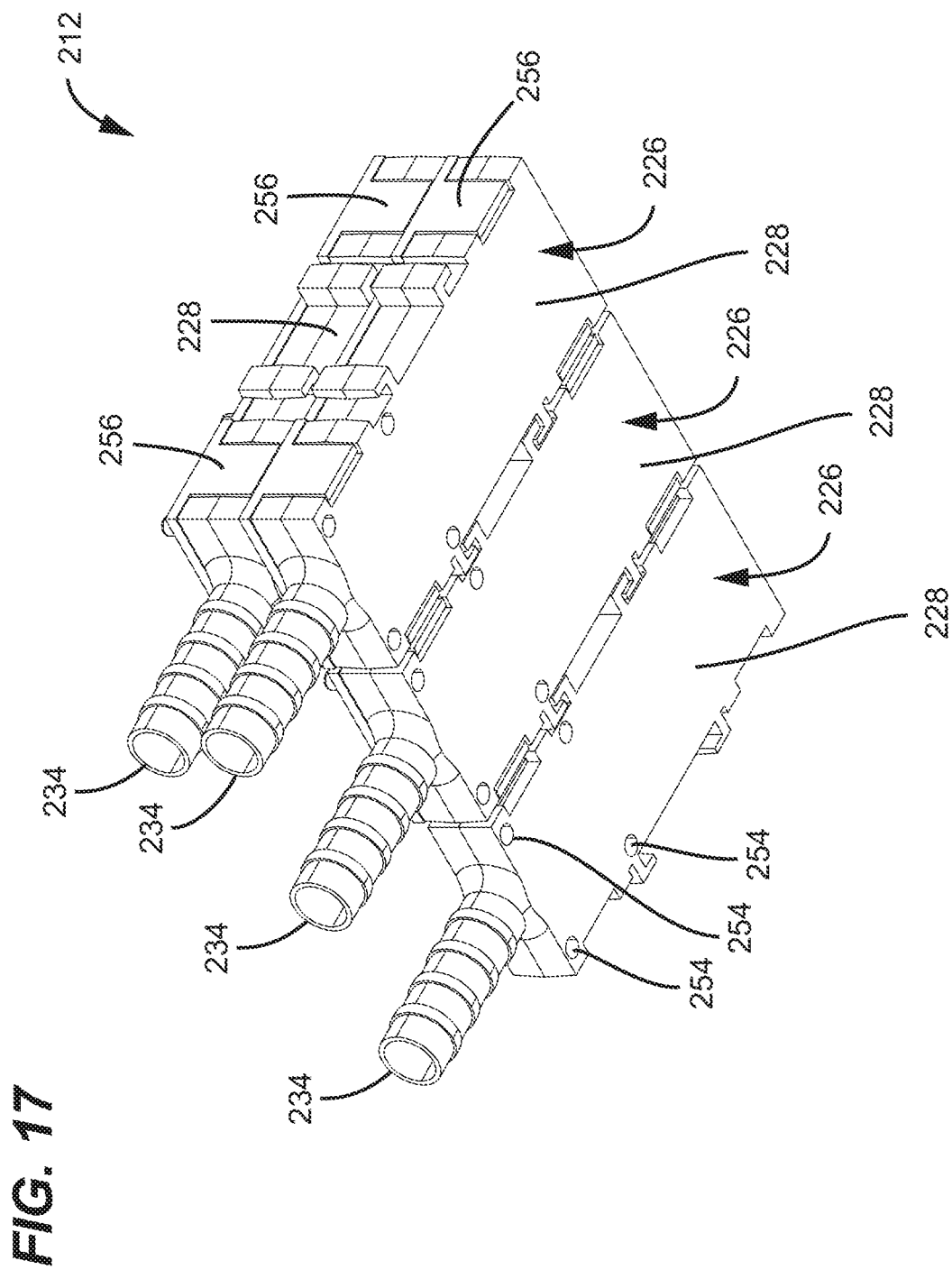
FIG. 17 is another perspective view of a portion of the main fanout of FIG. 15.
Figure 18:
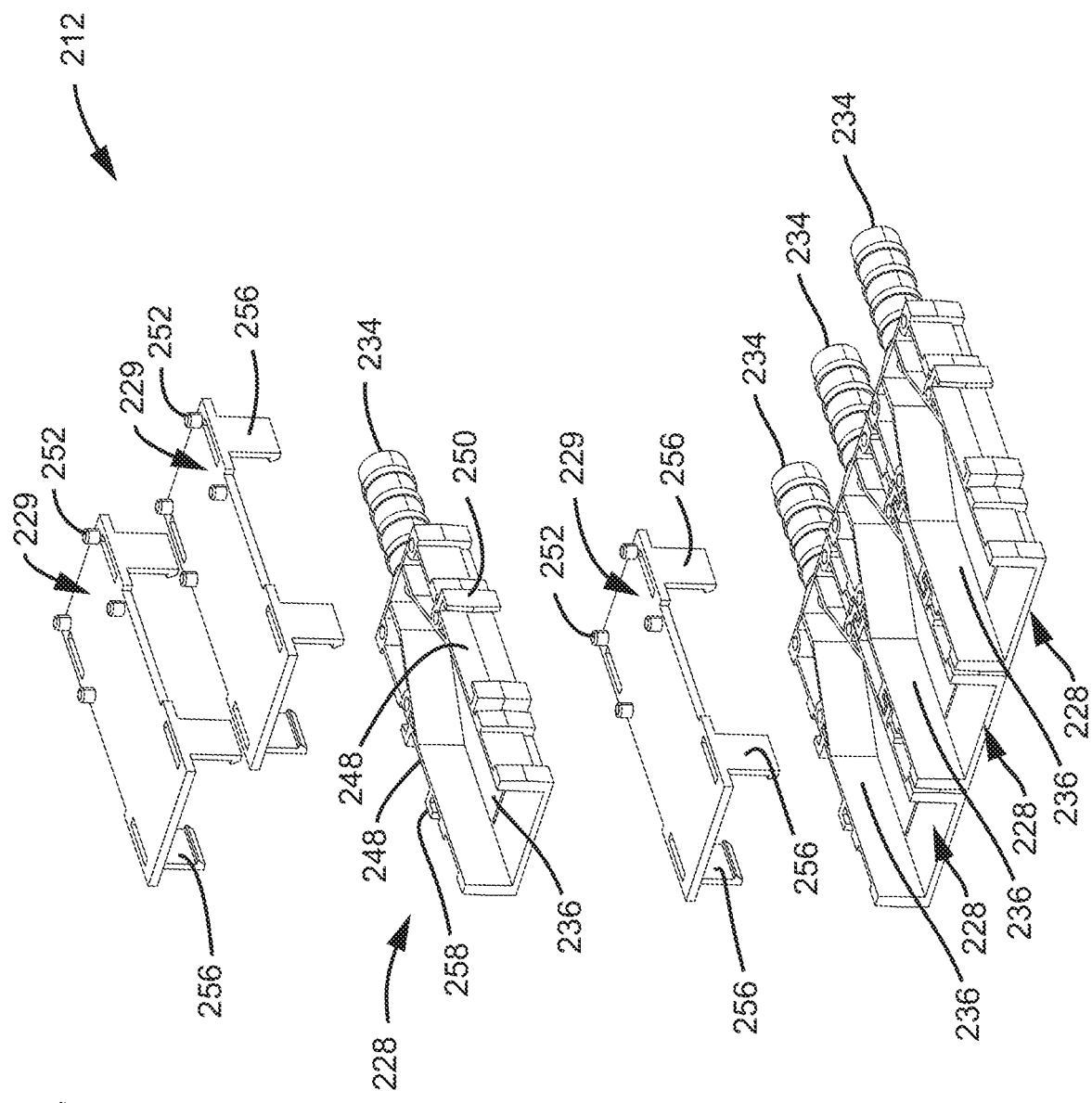
FIG. 18 is partially exploded view of a portion of the main fanout of FIG. 15.

FIGS. 16 and 17 show perspective views of a portion the main fanout 212. In the depicted example, and for illustration only, only a portion of the intermediate fanout devices 226 of the main fanout 212 are shown. FIG. 18 shows an exploded view of the portion of the main fanout 212 shown in FIG. 16.

The intermediate fanout device 226 include a main body 228, a cover 229, main body mating features 250, and cover mating features 252.

Figure 19:
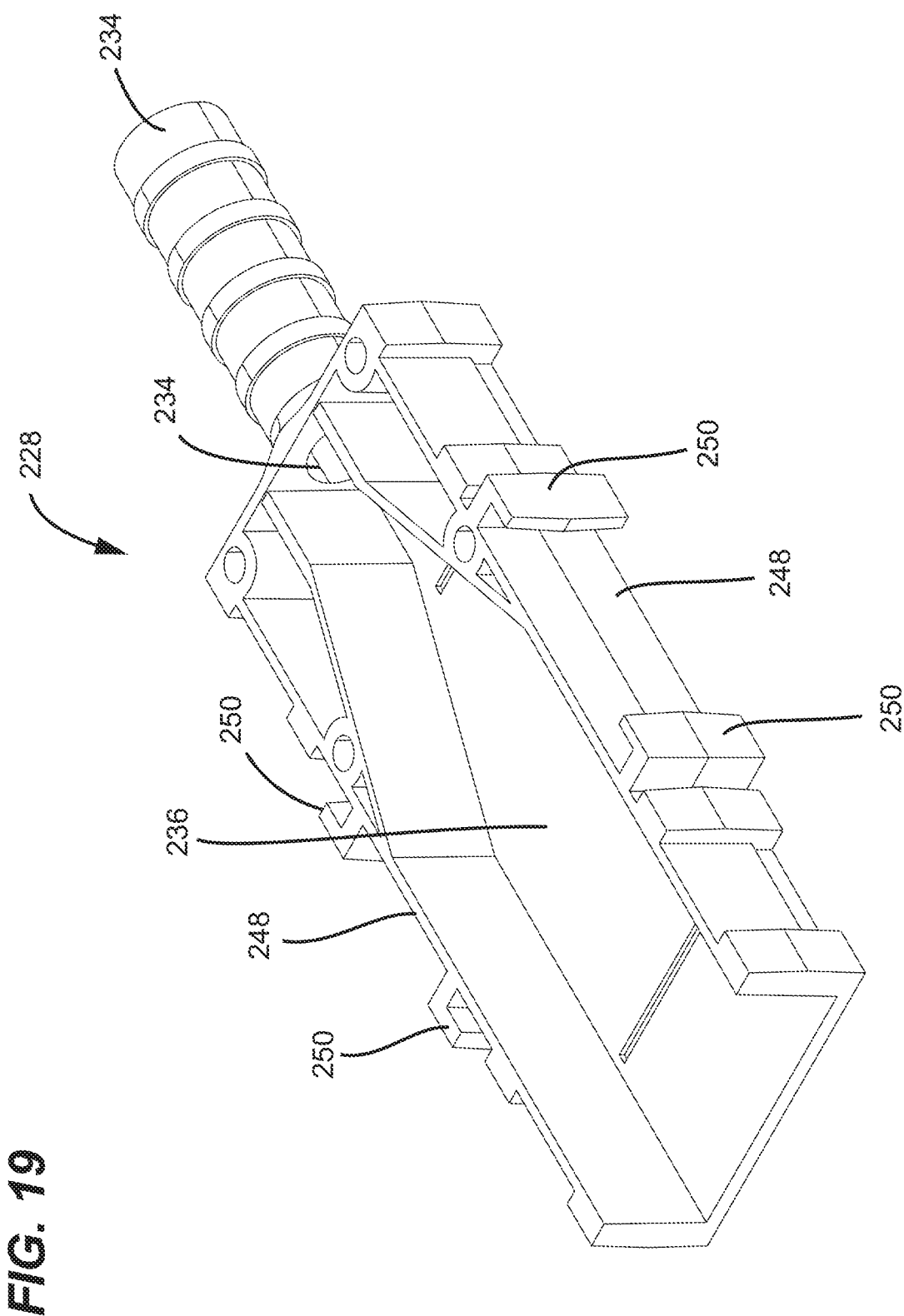
FIG. 19 is a perspective view of a main body of an intermediate fanout device of the main fanout of FIG. 15.
Figure 20:
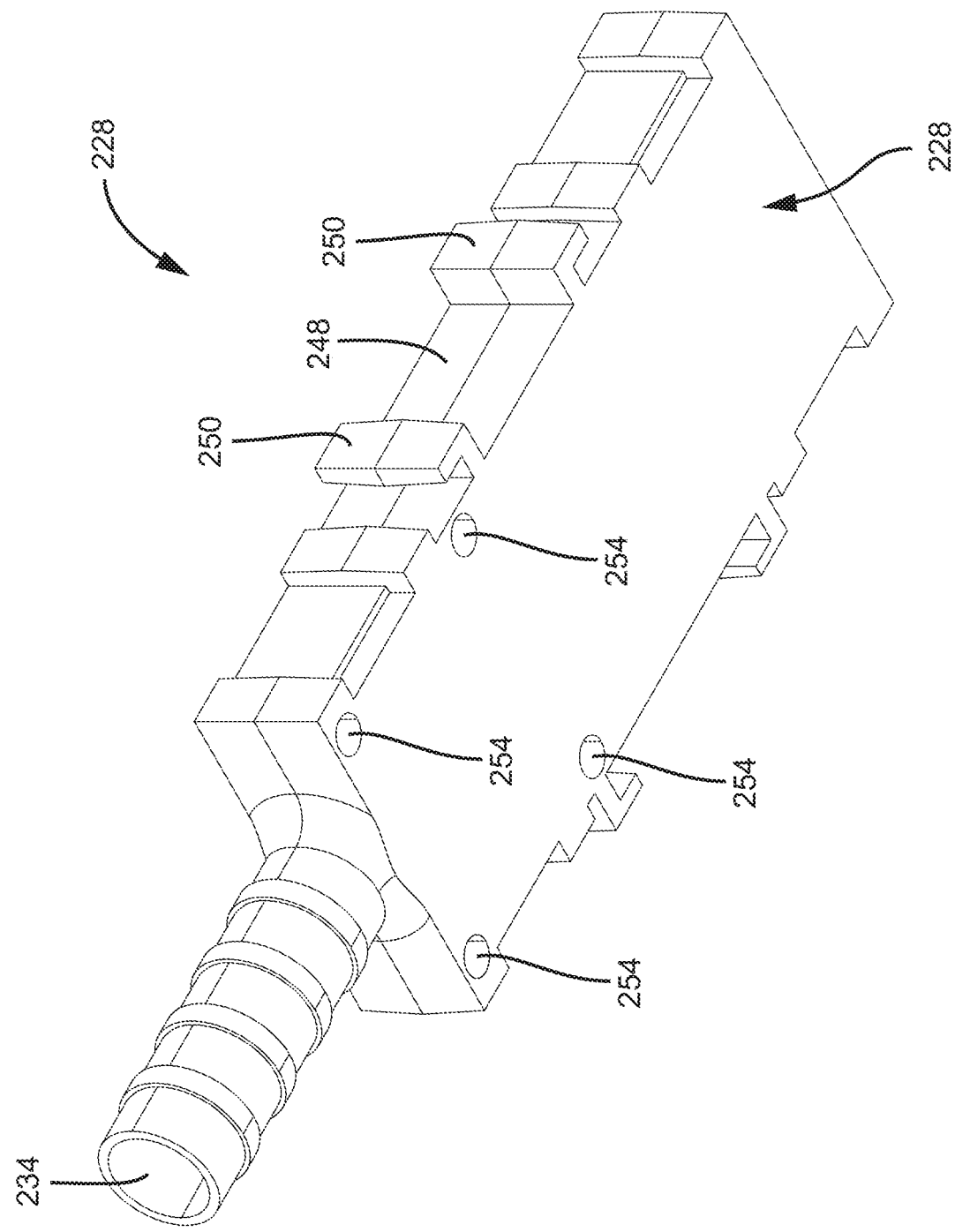
FIG. 20 is another perspective view of the main body of the intermediate fanout device of the main fanout of FIG. 15.

The main body 228 includes an opening 234 and a channel 236. FIGS. 19-20 show perspective views of the main body 228. The opening 234 is configured to receive, and at least partially surround, an intermediate cable 220. The channel 236 is configured to receive the plurality of optical fibers contained within the intermediate cable 220 that is received at the opening 234. In some examples, the channel 236 is configured to store at least one furcation tube 216 and the plurality of optical fibers. In some examples, the channel 236 is configured to receive an adhesive so as to secure the plurality of optical fibers and at least one furcation tube 216 therein. In some examples, the channel 236 is v-shaped. In some examples, the channel 236 has a v-shaped longitudinal cross-section.

The main body mating features 250 are disposed on the main body 228 to allow an intermediate fanout device 226 to mate with like main body mating features 250 of an adjacent intermediate fanout device 226. In the depicted examples, the main body mating features 250 are disposed on exterior walls of the channel 136. In some examples, the main body mating features 250 are tabs that are configured to interlock with other like tabs of an adjacent intermediate fanout device 226. In some examples, the main body mating features 250 are disposed on exterior walls 248 of the channel 236. The main body 228 also includes main body cover mating features 254, as can be seen in FIGS. 17 and 20, configured to mate with the cover mating features 252 of a cover 229 of an adjacent intermediate fanout device 226.

Figure 21:
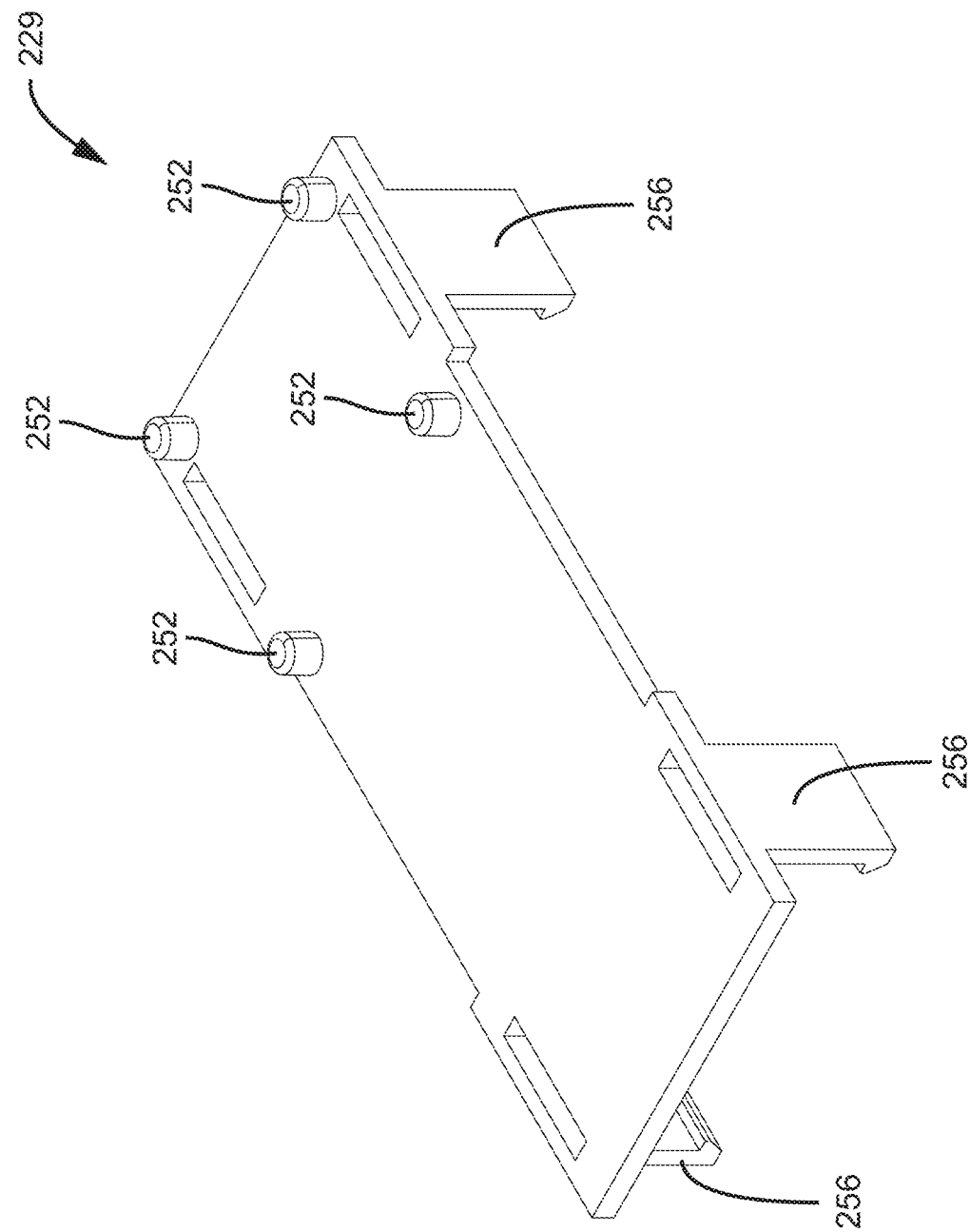
FIG. 21 is a perspective view of a cover of the intermediate fanout device of the main fanout of FIG. 15.
Figure 22:
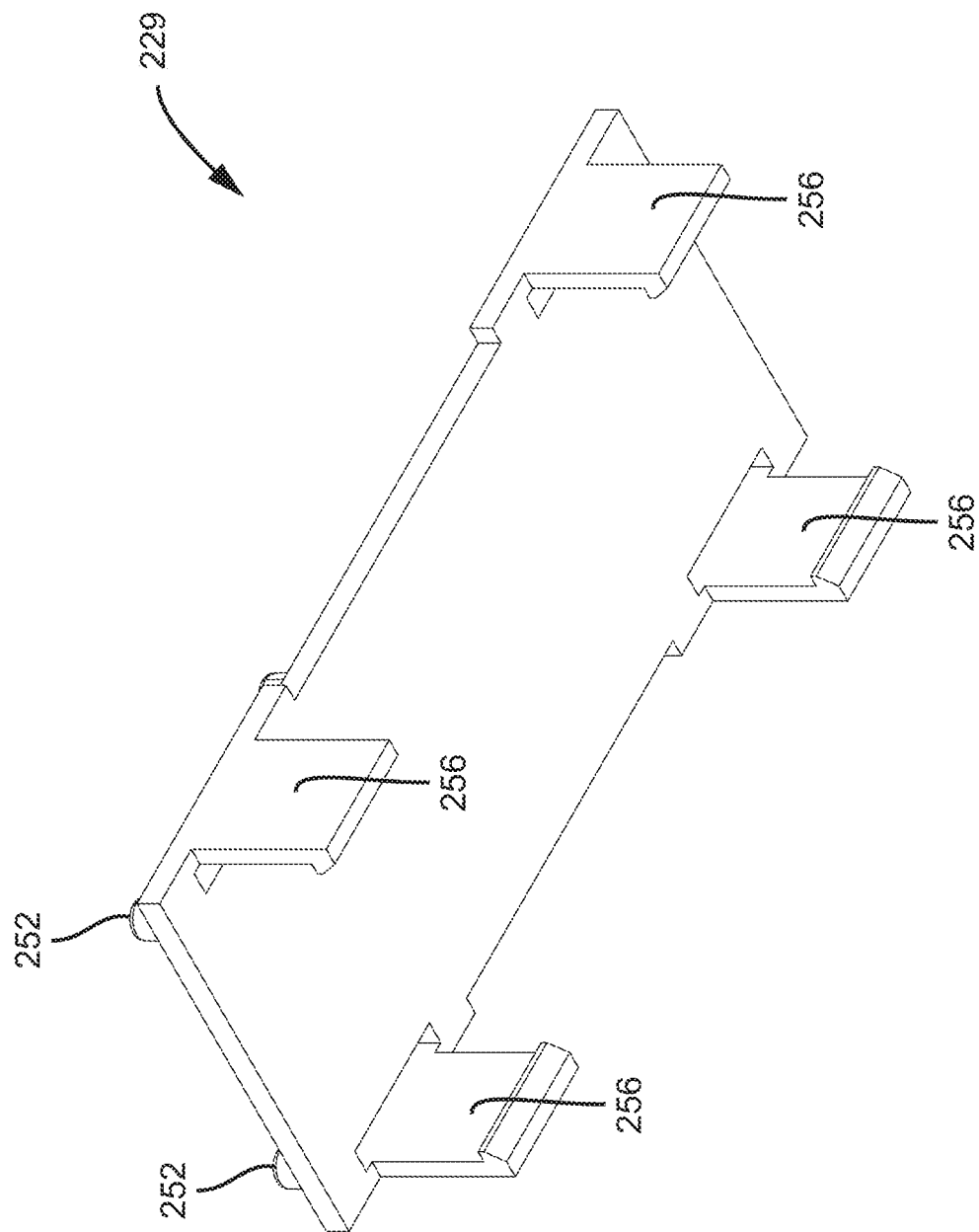
FIG. 22 is another perspective view of the cover of the intermediate fanout device of the main fanout of FIG. 15.

The cover 229 is configured to secure to the main body 228 to at least partially enclose the channel 236. FIGS. 20-21 show perspective views of the cover 229. The cover 229 can be attached to the main body 228 in a variety of different ways. In some examples, the cover 229 includes clips 256 configured to attach to the main body 228. In some examples, the cover 229 further includes an optional adhesive port to allow access to the channel 236 of the main body 228 when the cover 229 is mated with the main body 228. An adhesive port allows a user to fill the channel 236 with adhesive when the cover 229 is installed so that the entire channel 236 can be filled.

The cover mating features 252 are disposed on the cover 229 to allow an intermediate fanout device 226 to mate with like main body cover mating features 254 of an adjacent intermediate fanout device 226. In some examples, cover mating features 252 and the main body cover mating features 254 include projections and recesses.

Figure 23:
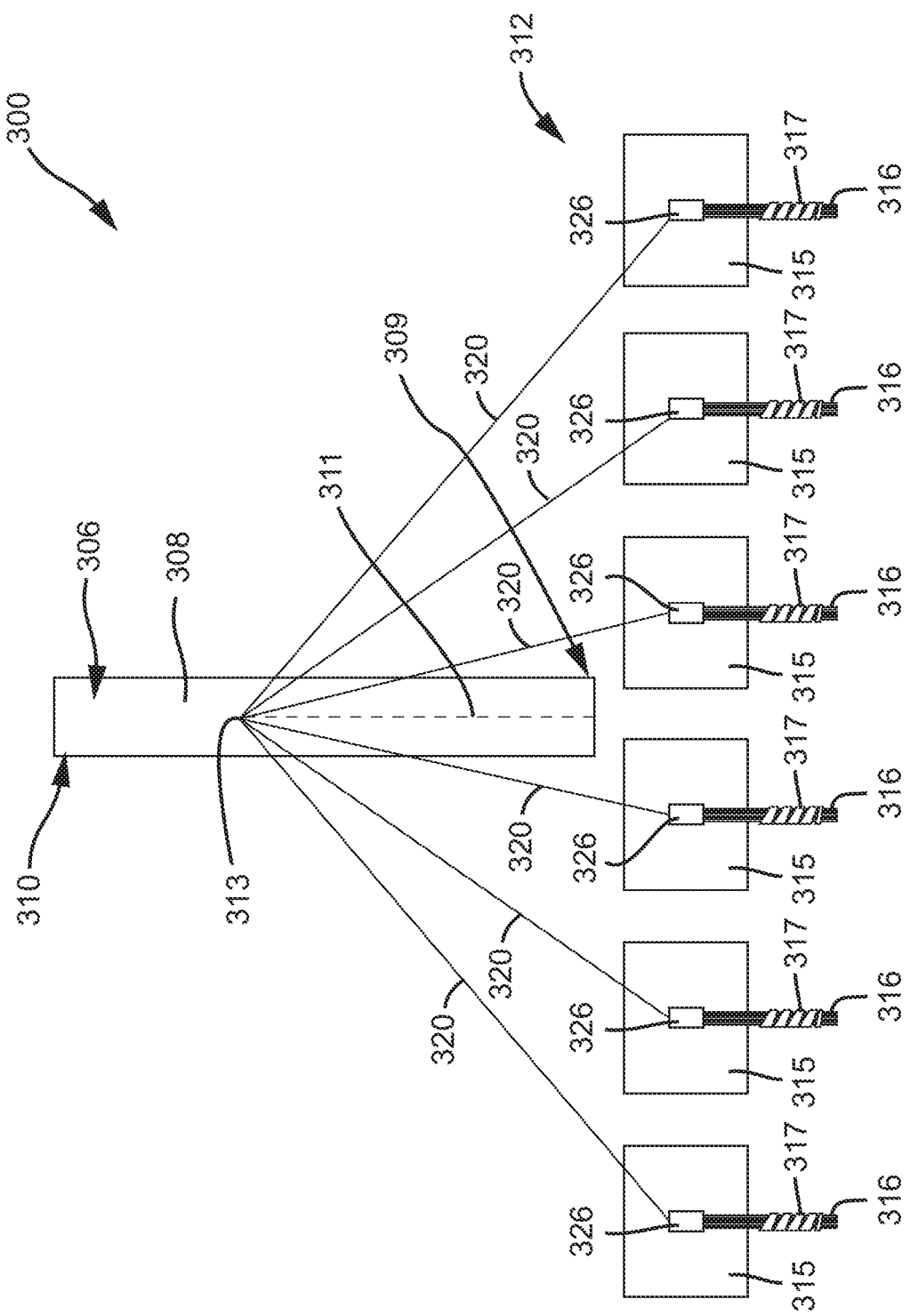
FIG. 23 is a schematic view of a manufacturing environment, according to one example of the present disclosure.

FIG. 23 shows an example of a manufacturing environment 300. The manufacturing environment 300 depicts an example manufacturing process of a main cable 306 including a main fanout 312 including a plurality of intermediate fanout devices 326. The main cable 306, main fanout 312, and plurality of intermediate fanout devices 326 are substantially similar to the main cable 106/206, main fanout 112/212, and plurality of intermediate fanout devices 126/226 described above.

In some implementations, the main fanout 312 is manufactured in a factory or other manufacturing site. In other implementations, the fanout 112 can be prepared in the field.

The main cable 306 has a main cable outer jacket 308 that has a first end 309 and a second end 310. The main cable 306 includes a plurality of intermediate cables 320 positioned within the main cable outer jacket 308. Each of the plurality of intermediate cables 320 includes an intermediate cable outer jacket 322. Each of the plurality of intermediate cables 320 contains a plurality of optical fibers 324 within the intermediate cable outer jacket 322.

The main cable outer jacket 308 is separated the along a slit 311 to expose the intermediate cables 320 positioned within the main cable 306. The slit 311 extends from the first end 309 of the main cable outer jacket 308 to a termination location 313 on the main cable outer jacket 308. By separating the main cable outer jacket 308 along the slit 311, the intermediate cables 320 can then be spread out of the main cable 306 without interfering with the main cable outer jacket 308.

Each intermediate cable 320 is routed to a work station 315. Each work station 315 can be a location where a single person or multiple people assemble a portion of the main fanout 312. In some examples, more than one intermediate cables 320 is routed to a single work station 315.

At each work station 315, furcation tubes 316 are positioned around each optical fiber 324 from each intermediate cable 320. In some examples, multiple optical fibers 324 are positioned within a single furcation tube 316. Once the furcation tubes 316 are positioned around the optical fibers 324, the optical fibers 324 and furcation tubes 316 are secured within a main body of an intermediate fanout 326 to form an assembled intermediate fanout 326. In some examples, the optical fibers 324 and furcation tubes 316 are secured to the main body of an intermediate fanout 326 using adhesive. In some examples, the optical fibers 324 and furcation tubes 316 are secured to the main body of an intermediate fanout 326 using a cover, or the like, to trap the optical fibers 324 and furcation tubes 316 within the intermediate fanout 326. In some examples, the furcation tubes 316 that extend from each intermediate fanout device 326 can be bundled together using a using a bundling device 317.

Assembled intermediate fanouts 326 from each work station 315 are then connected to one another using integral mating features of each intermediate fanout device so that the mating features of the intermediate fanout devices 326 reduce relative movement between adjacent intermediate fanout devices 326. Once the assembled intermediate fanouts 326 connected, a main fanout 312 is formed. In some examples, a shrinkable tube can be positioned around the main fanout 312, once assembled.

The main cable outer jacket 308 can be covered with one or more of a spiral wrap, a tape, a heat shrink, or other covering to cover up both the outer jacket 308 and the slit 311 in the jacket. In some examples, the slit 311 can be sealed or closed so as to replace the outer jacket 308.

In some examples a shrinkable tube or other wrap or cover can be positioned around the plurality of intermediate cables 320 that extend from the first end 309 of the main cable outer jacket 308.

By enabling a plurality of work stations 315 to assemble each intermediate fanout 326, the main fanout 312 can be assembled quickly and have a high optical fiber density. Further, this provides an end user with a compact elegant solution and also allows the manufacturer of the main cable 306 with the main fanout 312 the opportunity to increase throughput of a manufacturing facility.

EXAMPLES

Examples of the disclosure are reflected in the below-listing of examples, as well as the claims included herein.

In Example 1, an optical fiber cable includes a main cable outer jacket that has a first end and a second end. The main cable outer jacket has a slit that extends from the first end of the main cable outer jacket to a termination location on the main cable outer jacket. The optical fiber cable includes a slit cover positioned over the main cable outer jacket. The slit cover extends at least from the termination location to the first end of the main cable outer jacket to cover the slit. The optical fiber cable includes a plurality of intermediate cables positioned within the main cable outer jacket. Each of the plurality of intermediate cables contains a plurality of optical fibers within an intermediate cable outer jacket. The optical fiber cable includes a main fanout. The main fanout includes a plurality of intermediate fanout devices that are connected to one another. Each intermediate fanout device is connected to an intermediate cable of the plurality of intermediate cables. The plurality of optical fibers of each intermediate cable is positioned within at least one furcation tube. The plurality of optical fibers and at least one furcation tube is secured to a main body of each intermediate fanout device. Each intermediate fanout device includes a mating feature to connect to adjacent intermediate fanout devices with a like mating feature. The mating feature reduces relative movement between adjacent intermediate fanout devices.

In Example 2, the optical fiber cable of Example 1 is modified in that the plurality of optical fibers and at least one furcation tube are secured to the main body of each intermediate fanout device using adhesive.

In Example 3, the optical fiber cable of any of the Examples 1-2, is modified in that the main body of each intermediate fanout of the plurality of intermediate fanout devices includes a first end and a second end, the first end including an opening for receiving and, at least partially surrounding, an intermediate cable of the plurality of intermediate cables, the second end including a v-shaped channel for positioning, and securing therein, the plurality of optical fibers and the at least one furcation tube.

In Example 4, the optical fiber cable of Example 3 is modified in that the v-shaped channel is an open channel.

In Example 5, the optical fiber cable of Examples 3-4 is modified in that the v-shaped channel has a v-shaped cross-section transverse to a longitudinal axis of the main body of the intermediate fanout device.

In Example 6, the optical fiber cable of Examples 3-5 is modified in that the v-shaped channel has a v-shaped cross-section aligned with a longitudinal axis of the main body of the intermediate fanout device.

In Example 7, the optical fiber cable of Examples 3-6 is modified in that the mating features are disposed on the main body, adjacent the v-shaped channel.

In Example 8, the optical fiber cable of Examples 1-7 is modified in that each intermediate fanout device includes a plurality of mating features, the plurality of mating features being disposed on an exterior wall of a v-shaped channel and are at least one of a projection and a recess.

In Example 9, the optical fiber cable of Example 8 is modified in that the mating features include both a projection and a recess.

In Example 10, the optical fiber cable of Example 8 is modified in that the mating features are tabs configured to interlock with tabs of adjacent intermediate fanouts.

In Example 11, the optical fiber cable of Examples 1-10 is modified in that the main fanout is cylindrical.

In Example 12, the optical fiber cable of Examples 1-10 is modified in that the main fanout is rectangular.

In Example 13, the optical fiber cable of Examples 1-12 is modified in that the main fanout includes a strength member, and wherein the plurality of intermediate fanout devices surround the strength member.

In Example 14, the optical fiber cable of Examples 1-13 is modified in that each intermediate fanout device of the plurality of intermediate fanout devices further comprises a cover connected to the main body and covering the v-shaped channel, wherein the cover includes mating features facing away from the v-shaped channel, and wherein the mating features of the cover are at least one of projections and recesses.

In Example 15, the optical fiber cable of Example 14 is modified in that the cover connects to the main body via clips.

In Example 16, a method of forming a fanout arrangement of telecommunications cable comprises providing a main cable having a main cable outer jacket having a first end and a second end, the main cable including a plurality of intermediate cables within the main cable outer jacket, each of the plurality of intermediate cables having an intermediate cable outer jacket, each of the plurality of intermediate cables containing a plurality of optical fibers within the intermediate cable outer jacket. The method further includes separating the main cable outer jacket along a slit to expose the intermediate cables, the slit extending from the first end of the main cable outer jacket to a termination location. The method then comprises positioning each of the plurality of intermediate cables at at least one of a plurality of work stations, wherein the method at each work station includes: positioning a furcation tube around at least one of the optical fibers of the plurality of optical fibers; and securing the plurality of optical fibers and furcation tubes within a main body of an intermediate fanout device, the furcation tubes extending away from the main body. The method further includes connecting each of the intermediate fanout devices from each work station to one another using an integral mating feature of each intermediate fanout device, wherein the mating features of the intermediate fanout devices reduce relative movement between adjacent intermediate fanout devices; and forming a main fanout from the plurality of intermediate fanout devices.

In Example 17, the method of Example 16 is modified to further include sealing the slit.

In Example 18, the method of Example 17 is modified to further include sealing the slit by positioning a slit cover around the main cable outer jacket extending from the first end of the main cable outer jacket to the termination location to cover the slit.

In Example 19, the method of Examples 16-18 is modified to further include bundling the furcation tubes extending from each intermediate fanout device using a bundling device.

In Example 20, the method of Examples 16-19 is modified to further include positioning at least one of cold shrink and heat shrink around the plurality of intermediate cables extending from the first end of the main cable outer jacket.

In Example 21, the method of Examples 16-20 is modified in that the main body of each intermediate fanout device of the plurality of intermediate fanout devices includes a first end and a second end, the first end including an opening for receiving and, at least partially surrounding, an intermediate cable of the plurality of intermediate cables, the second end including a v-shaped channel for positioning, and securing therein, the plurality of optical fibers and the at least one furcation tube.

In Example 22, the method of Example 21 is modified in that the v-shaped channel has a v-shaped cross-section transverse to a longitudinal axis of the main body of the intermediate fanout device.

In Example 23, the method of Example 21 is modified in that the v-shaped channel has a v-shaped cross-section aligned with a longitudinal axis of the main body of the intermediate fanout device.

In Example 24, the method of Examples 16-23 is modified in that each intermediate fanout device of the plurality of intermediate fanout devices further comprises a cover connected to the main body and covering the v-shaped channel, wherein the cover includes mating features facing away from the v-shaped channel, and wherein the mating features of the cover are at least one of projections and recesses.

In Example 25, the method of Example 24 is modified in that the cover connects to the main body via clips.

In Example 26, an optical fiber cable includes a main cable outer jacket having a first end and a second end. A plurality of intermediate cables is positioned within the main cable outer jacket, each of the plurality of intermediate cables containing a plurality of optical fibers within an intermediate cable outer jacket. The optical fiber cable includes a main fanout including a plurality of intermediate fanout devices connected to one another, each intermediate fanout device being connected to an intermediate cable of the plurality of intermediate cables, the plurality of optical fibers of each intermediate cable being positioned within a plurality of furcation tubes, wherein the plurality of optical fibers and the plurality of furcation tubes are secured to a main body of each intermediate fanout device. The main fanout includes an attachment device for attaching all of the intermediate fanout devices from the main cable outer jacket together, wherein the attachment device reduces relative movement between the intermediate fanout devices.

In Example 27, the optical fiber cable of Example 26 is modified to further include a cover over the plurality of intermediate cables.

In Example 28 the optical fiber cable of Examples 26 and 27 is modified in that the main fanout is cylindrical.

In Example 29 the optical fiber cable of Examples 26 and 27 is modified in that the main fanout is rectangular.

In Example 30, a method of forming a fanout arrangement of telecommunications cable comprises providing a main cable having a main cable outer jacket having a first end and a second end, the main cable including a plurality of intermediate cables within the main cable outer jacket, each of the plurality of intermediate cables having an intermediate cable outer jacket, each of the plurality of intermediate cables containing a plurality of optical fibers within the intermediate cable outer jacket. The method further includes separating the main cable outer jacket to expose the intermediate cables and positioning each of the plurality of intermediate cables at at least one of a plurality of work stations. The method at each work station includes positioning a furcation tube around at least one of the optical fibers of the plurality of optical fibers; and securing the plurality of optical fibers and furcation tubes within a main body of an intermediate fanout device, the furcation tubes extending away from the main body. The method further includes connecting each of the intermediate fanout devices from each work station to one another using an attachment device and covering a portion of a plurality of exposed intermediate cables to form a covered group including at least two intermediate cables. The method includes forming a main fanout from the plurality of intermediate fanout devices.

In Example 31, the method of Example 30 is modified in that the covering step includes covering the plurality of exposed intermediate cables with a slit portion of the main cable outer jacket.

In Example 32, the method of Examples 30 and 31 is modified to further include positioning at least one of cold shrink and heat shrink around the plurality of intermediate cables.

In Example 33, the method of Examples 30-32 is modified in that the main body of each intermediate fanout device of the plurality of intermediate fanout devices includes a first end and a second end, the first end including an opening for receiving and, at least partially surrounding, an intermediate cable of the plurality of intermediate cables, the second end including a v-shaped channel for positioning, and securing therein, the plurality of optical fibers and the at least one furcation tube.

In Example 34, the method of Examples 30-32 is modified in that the main body of each intermediate fanout device of the plurality of intermediate fanout devices includes a first end and a second end, the first end including an opening for receiving and, at least partially surrounding, an intermediate cable of the plurality of intermediate cables, the second end including a rectangular channel for positioning, and securing therein, the plurality of optical fibers and the at least one furcation tube.

In Example 35, a telecommunications system includes a main cable outer jacket that has a first end and a second end. The telecommunications system includes a plurality of intermediate cables positioned within the main cable outer jacket, each of the plurality of intermediate cables contains a plurality of optical fibers within an intermediate cable outer jacket. The telecommunications system includes a chassis that receives the plurality of intermediate cables. The telecommunications system includes a fanout positioned at least partially within the chassis. The fanout is connected to at least one of the plurality intermediate. The plurality of optical fibers of each intermediate cables is positioned within a plurality of furcation tubes. The telecommunications system includes a cable guide positioned within chassis. The cable guide defines at least one cable channel. At least one of the plurality of furcation tubes is positioned, and movable, within the at least one cable channel. The at least one cable channel has an open position, where access to the at least one cable channel is allowed, and a closed position, where access to the at least one cable channel is restricted.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. An optical fiber cable comprising:
    a main cable outer jacket having a first end and a second end, the main cable outer jacket having a slit extending from the first end of the main cable outer jacket to a termination location on the main cable outer jacket;
    a slit cover positioned over the main cable outer jacket, the slit cover extending at least from the termination location to the first end of the main cable outer jacket to cover the slit;
    a plurality of intermediate cables positioned within the main cable outer jacket, each of the plurality of intermediate cables containing a plurality of optical fibers within an intermediate cable outer jacket;
    a main fanout including:
        a plurality of intermediate fanout devices connected to one another, each intermediate fanout device being connected to an intermediate cable of the plurality of intermediate cables, the plurality of optical fibers of each intermediate cable being positioned within at least one furcation tube, wherein the plurality of optical fibers and at least one furcation tube is secured to a main body of each intermediate fanout device, each intermediate fanout device including a mating feature to connect to adjacent intermediate fanout devices with a like mating feature, wherein the mating feature reduces relative movement between adjacent intermediate fanout devices, and
        wherein the main body of each intermediate fanout device includes a first end and a second end, the first end of the main body including an opening for receiving and, at least partially surrounding the intermediate cable of the plurality of intermediate cables, the second end of the main body including a v-shaped channel for positioning and securing therein, the plurality of optical fibers and at least one furcation tube, the plurality of optical fibers entering the v-shaped channel outside of the intermediate cable outer jacket and leaving the v-shaped channel disposed within the at least one furcation tube.

2. The optical fiber cable of claim 1, wherein the plurality of optical fibers and at least one furcation tube are secured to the main body of each intermediate fanout device using adhesive.

3. The optical fiber cable of claim 1, wherein the v-shaped channel is an open channel.

4. The optical fiber cable of claim 1, wherein the v-shaped channel has a v-shaped cross-section transverse to a longitudinal axis of the main body of the intermediate fanout device.

5. The optical fiber cable of claim 1, wherein the v-shaped channel has a v-shaped cross-section aligned with a longitudinal axis of the main body of the intermediate fanout device.

6. The optical fiber cable of claim 1, wherein the mating features are disposed on the main body, adjacent the v-shaped channel.

7. The optical fiber cable of claim 1, wherein each intermediate fanout device includes a plurality of mating features, the plurality of mating features being disposed on an exterior wall of the v-shaped channel and are at least one of a projection and a recess.

8. The optical fiber cable of claim 7, wherein the mating features include both a projection and a recess.

9. The optical fiber cable of claim 7, wherein the mating features are tabs configured to interlock with tabs of adjacent intermediate fanout devices.

10. The optical fiber cable of claim 1, wherein the main fanout is cylindrical.

11. The optical fiber cable of claim 1, wherein the main fanout is rectangular.

12. The optical fiber cable of claim 1, wherein the main fanout includes a strength member, and wherein the plurality of intermediate fanout devices surround the strength member.

13. The optical fiber cable of any of the claim 1, wherein each intermediate fanout device of the plurality of intermediate fanout devices further comprises a cover connected to the main body and covering the v-shaped channel, wherein the cover includes mating features facing away from the v-shaped channel, and wherein the mating features of the cover are at least one of projections and recesses.

14. The optical fiber cable of claim 13, wherein the cover connects to the main body via clips.

* * * * *

UNITED STATES PATENT AND TRADEMARK OFFICE
CERTIFICATE OF CORRECTION

| | | |
|---|---|---|
| PATENT NO. | : 12,140,812 B2 | Page 1 of 1 |
| APPLICATION NO. | : 17/604105 | |
| DATED | : November 12, 2024 | |
| INVENTOR(S) | : Jonathan R. Kaml et al. | |

It is certified that error appears in the above-identified patent and that said Letters Patent is hereby corrected as shown below:

In the Specification

Column 1, Line 11: "disclosures of which is are" should read --disclosures of which are--

Signed and Sealed this
Twenty-second Day of April, 2025

Coke Morgan Stewart
*Acting Director of the United States Patent and Trademark Office*